United States Patent
Lee et al.

(10) Patent No.: US 10,244,177 B2
(45) Date of Patent: Mar. 26, 2019

(54) METHOD FOR PROCESSING IMAGE TO GENERATE RELEVANT DATA BASED ON USER INPUTS AND ELECTRONIC DEVICE SUPPORTING THE SAME

(71) Applicant: Samsung Electronics Co., Ltd., Gyeonggi-do (KR)

(72) Inventors: Wooyong Lee, Gyeonggi-do (KR); Kihuk Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 79 days.

(21) Appl. No.: 15/232,015

(22) Filed: Aug. 9, 2016

(65) Prior Publication Data
US 2017/0048461 A1 Feb. 16, 2017

(30) Foreign Application Priority Data
Aug. 12, 2015 (KR) .................. 10-2015-0114160

(51) Int. Cl.
*H04N 5/232* (2006.01)
*H04M 1/725* (2006.01)
*G06F 3/0481* (2013.01)

(52) U.S. Cl.
CPC ..... *H04N 5/23293* (2013.01); *G06F 3/04817* (2013.01); *H04M 1/72583* (2013.01); *H04N 5/23216* (2013.01)

(58) Field of Classification Search
CPC .......... H04N 5/23293; H04N 5/23216; H04M 1/72583; G06F 3/04817
See application file for complete search history.

(56) References Cited

U.S. PATENT DOCUMENTS

| | | | | |
|---|---|---|---|---|
| 2008/0198243 | A1* | 8/2008 | Kijima | H04N 1/2112 348/231.99 |
| 2009/0091633 | A1* | 4/2009 | Tamaru | G02B 7/38 348/208.14 |
| 2010/0309334 | A1* | 12/2010 | James | H04N 5/144 348/231.2 |
| 2010/0309335 | A1* | 12/2010 | Brunner | H04N 5/144 348/231.6 |
| 2016/0225175 | A1* | 8/2016 | Kim | H04B 1/3833 |

* cited by examiner

*Primary Examiner* — Hung H Lam
(74) *Attorney, Agent, or Firm* — Cha & Reiter LLC.

(57) ABSTRACT

An electronic device can include a camera, a display, a processor coupled to the camera and the display, and a memory coupled to the processor, wherein the processor when executing instructions stored in the memory is configured to display a preview image obtained from the camera on a first user interface on the display, receive a first input of a user, capture a plurality of images using the camera in response to the first input of the user, for each captured plurality of images, generate data corresponding to a processing of the captured plurality of images, receive a second input of the user during or after the data generation, process at least one of the captured plurality of images based on the generated data in response to the received second input, and display the processed at least one of the captured plurality of images on a second user interface on the display.

16 Claims, 16 Drawing Sheets

METHOD FOR PROCESSING IMAGE TO GENERATE RELEVANT DATA BASED ON USER INPUTS AND ELECTRONIC DEVICE SUPPORTING THE SAME

CLAIM OF PRIORITY

The present application claims the benefit under 35 U.S.C. § 119(a) to a Korean patent application filed in the Korean Intellectual Property Office on Aug. 12, 2015, and assigned Serial No. 10-2015-0114160, the entire disclosure of which is hereby incorporated by reference.

TECHNICAL FIELD

The present disclosure relates to a method of processing images captured from a camera and an electronic device supporting the same.

BACKGROUND

Based on remarkable advances in information communication technology and semiconductor technology, various electronic devices, such as smartphones and tablets, have been made commercially available and are subject to wide usage. These electronic devices have been developed to converge with what traditionally have been separate devices. For example, the electronic device such as the smartphone now routinely includes a camera, which can capture not only a still image but also a moving image. Often, these electronic devices can perform various processes on the images captured by their cameras. For example, the electronic devices can correct hue, brightness, and/or contrast of the captured image. Accordingly, the electronic devices can process the images to provide an image with the best quality among a plurality of images acquired in succession by the camera.

Typically, processed images may be displayed on the electronic devices in a preview mode. But when the image processing requires excessive computing power, the electronic device may consume considerable battery power and/or cause lags in the input/output of the electronic device. In other cases, when the electronic device uses excessive computing power to process the image after capturing the image, it may take a long time to display the captured image.

SUMMARY

To address the above-discussed deficiencies of the prior art, it is a primary aspect of the present disclosure to provide an image processing method for enhancing performance and real-time of an electronic device by executing a portion of an image processing function while acquiring an image using a camera, and the electronic device supporting the same.

According to one aspect of the present disclosure, an electronic device can include a camera, a display, a processor coupled to the camera and the display, and a memory coupled to the processor, wherein the processor when executing instructions stored in the memory is configured to display a preview image obtained from the camera on a first user interface on the display, receive a first input of a user, capture a plurality of images using the camera in response to the first input of the user, for each captured plurality of images, generate data corresponding to a processing of the captured plurality of images, receive a second input of the user during or after the data generation, process at least one of the captured plurality of images based on the generated data in response to the received second input, and display the processed at least one of the captured plurality of images on a second user interface on the display.

According to another aspect of the present disclosure, an electronic device can include a camera, a display, a processor coupled to the camera and the display, and a memory coupled to the processor, wherein the processor when executing instructions stored in the memory is configured to display an image obtained through the camera on a first user interface on the display, generate data corresponding to a processing of the image by executing a portion of, but not an entirety of, at least one of a plurality of routines for image processing while displaying the image, receive a first user input for capturing the image during or after the data generation, capture the image using the camera in response to the first user input, select at least one of the plurality of routines based on the generated data, and process the captured image by executing a remaining portion of the at least one selected routine.

According to yet another aspect of the present disclosure, an electronic device can include a camera, a display, a processor coupled to the camera and the display, and a memory coupled to the processor, wherein the processor when executing instructions stored in the memory is configured to capture at least one image using the camera, obtain an attribute of the at least one image and generate data related to the attribute, store the at least one image and the generated data, receive a user request for the captured image, and in response to the received user request, perform at least a portion of at least one preset function on the at least one image based on the generated data.

According to still another aspect of the present disclosure, a method for capturing at least one image using a camera, obtaining an attribute of the at least one image and generating data related to the attribute, storing the at least one image and the generated data, receiving a user request for the captured image; and in response to the received user request, performing at least a portion of at least one preset function on the at least one image obtained using a camera based on the generated data.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present disclosure will be more apparent from the following description taken in conjunction with the accompanying drawings, in which.

Throughout the drawings, like reference numerals will be understood to refer to like parts, components and structures.

DETAILED DESCRIPTION

Figure 1:
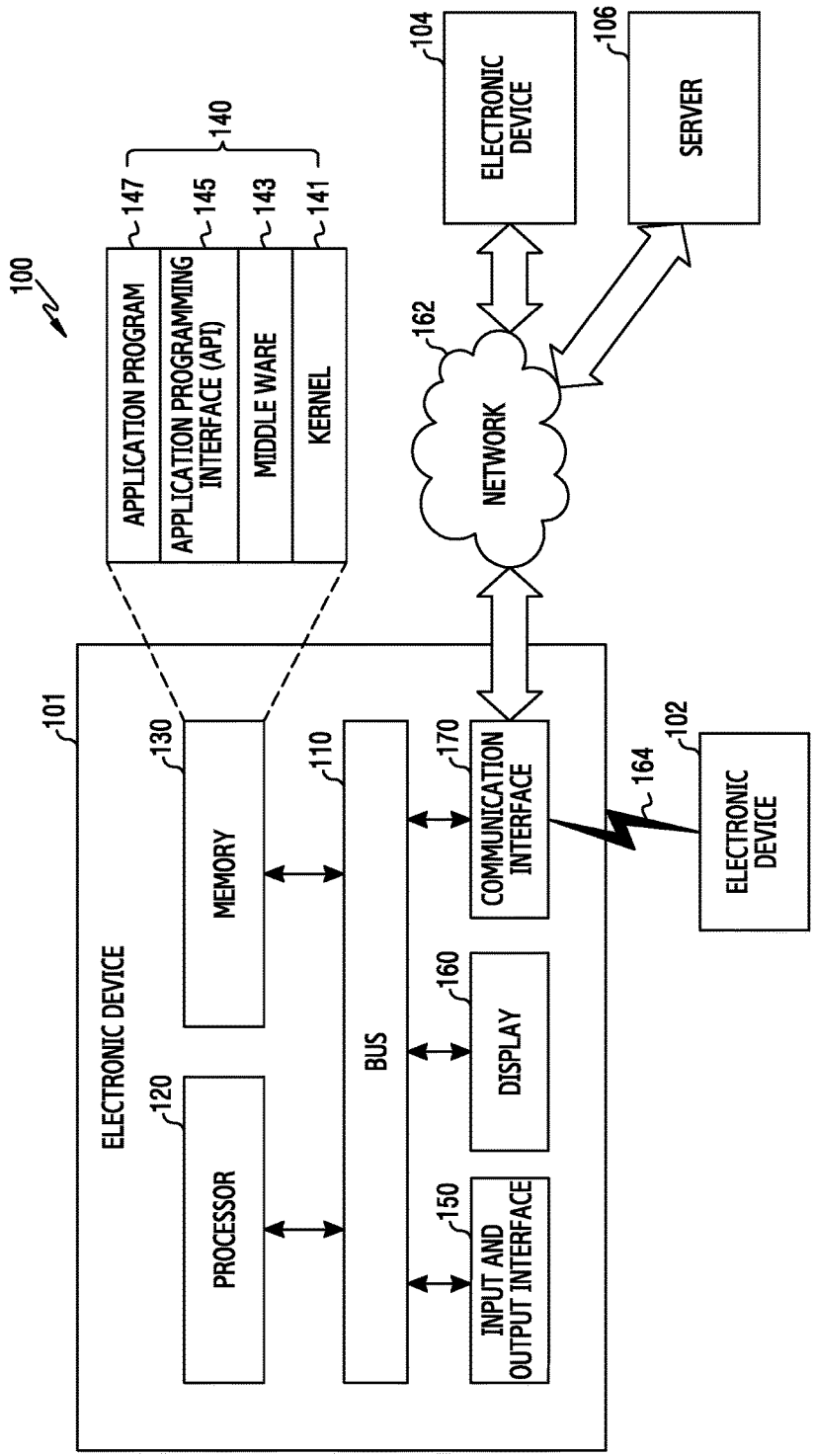
FIG. 1 is a diagram of a network including an electronic device according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. In some embodiments, the electronic device 101 may omit at least one of the above elements or may further include other elements.

The bus 110 may include, for example, a circuit for connecting the elements 110-170 and transferring communication (e.g., control messages and/or data) between the elements.

The processor 120 may include one or more of a Central Processing Unit (CPU), an Application Processor (AP), and a Communication Processor (CP). The processor 120, for example, may carry out operations or data processing relating to control and/or communication of at least one other element of the electronic device 101. An artisan understands and appreciates that a "processor" or "microprocessor" constitute hardware in the claimed invention. Under the broadest reasonable interpretation, the appended claims constitute statutory subject matter in compliance with 35 U.S.C. § 101. In addition, a processor as described herein may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. The processor 120 may receive, for example, an instruction from the above-described other elements (e.g., the memory 130, the I/O interface 150, the display 160, or the communication interface 170, etc.) via the bus 110, decipher the received instruction, and execute an operation or a data process corresponding to the deciphered instruction.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130 and/or other hardware and software resources) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more operation requests received from the application program 147 according to priority. For example, the middleware 143 may give priority to use the system resources of the electronic device 101 (for example, the bus 110, the processor 120, the memory 130, and the like) to at least one of the application programs 147. For example, the middleware 143 may perform scheduling or load balancing with respect to the one or more operation requests by processing the one or more operation requests according to the priority given to the at least one application program.

The API 145 is an interface through which the applications 147 control functions provided from the kernel 141 or the middleware 143, and may include, for example, at least one interface or function (e.g., instruction) for file control, window control, image processing, or text control.

The input/output interface 150, for example, may function as an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160, for example, may display various types of content (e.g., text, images, videos, icons, or symbols) for the user. The display 160 may include a touch screen and receive, for example, a touch, gesture, proximity, or hovering input using an electronic pen or the user's body part using capacitive, resistive, or another type of technology.

The communication interface 170, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short range communication 164. The short-range communication 164 may be performed by using at least one of, for example, Wi-Fi, Bluetooth, Bluetooth low energy (BLE), Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network such as a computer network (e.g., a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic apparatus may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

Figure 2:
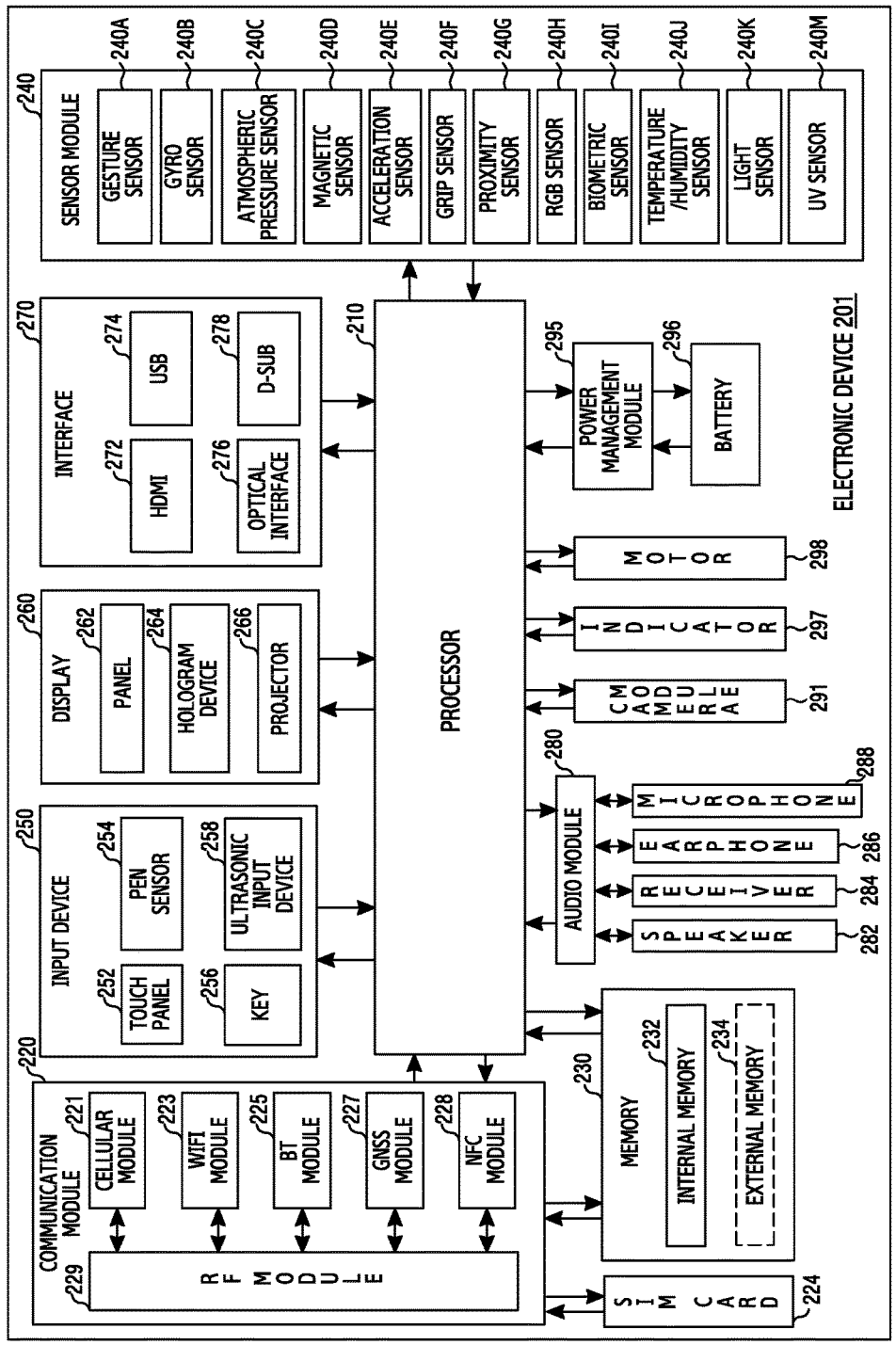
FIG. 2 is a block diagram of an electronic device according to various embodiments of the present disclosure.

FIG. 2 is a block diagram illustrating an electronic device according to various embodiments of the present disclosure.

FIG. 2 is a block diagram of an electronic device 201 according to various embodiments. For example, the electronic device 201 may include the whole or part of the electronic device 101 illustrated in FIG. 1. The electronic device 201 may include at least one processor (e.g., Application Processor (AP)) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298. The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute only software per se The processor 210 may control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration equal or similar to that of the communication interface 170 of FIG. 1. The communication module 220 may include, for example, the cellular module 221, a Wi-Fi module 223, a Bluetooth (BT) module 225, a Bluetooth low energy module 226, a GNSS module 227 (e.g., a GPS module, a Glonass module, a Beidou module, or a Galileo module), an NFC module 228, and a Radio Frequency (RF) module 229.

The cellular module 221 may provide a voice call, image call, a text message service, or an Internet service through, for example, a communication network. According to an embodiment, the cellular module 221 may distinguish between and authenticate electronic devices 201 within a communication network using a subscriber identification module (for example, the SIM card 224). According to an embodiment of the present disclosure, the cellular module 221 may perform at least some of the functions that the processor 210 may provide. According to an embodiment, the cellular module 221 may include a Communication Processor (CP).

Each of the Wi-Fi module 223, the BT module 225, the Bluetooth low energy module 226, the GNSS module 227, and the NFC module 228 may include, for example, a processor for processing data transmitted and received through the relevant module. According to some embodiments of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the Wi-Fi module 223, the BT module 225, the Bluetooth low energy module 226, the GNSS module 227, and the NFC module 228 may transmit and receive RF signals through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (for example, the memory 130) may include, for example, an internal memory 232 or an external memory 234. The embedded memory 232 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a Red/Green/Blue (RGB) sensor), a bio-sensor 240I, a temperature/humidity sensor 240J, a light sensor 240K, and an Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, the electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. Also, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic wavers generated by an input tool through a microphone (for example, a microphone 288) and identify data corresponding to the detected ultrasonic waves.

The display 260 (for example, the display 160) may include a panel 262, a hologram device 264 or a projector 266. The panel 262 may include a configuration that is identical or similar to the display 160 illustrated in FIG. 1. The panel 262 may be implemented to be, for example, flexible, transparent, or wearable. The panel 262 and the touch panel 252 may be implemented as one module. The hologram 264 may show a three dimensional image in the air by using an interference of light. The projector 266 may display an image by projecting light onto a screen. The screen may be located, for example, inside or outside the electronic device 201. According to an embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included in, for example, the input/output interface 150 illustrated in FIG. 1. The audio module 280 may process sound information which is input or output through, for example, a speaker 282, a receiver 284, earphones 286, the microphone 288 or the like.

The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 295 may manage, for example, power of the electronic device 201. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may display a particular state (e.g., a booting state, a message state, a charging state, or the like) of the electronic device 201 or a part (e.g., the processor 210). The motor 298 may convert an electrical signal into mechanical vibration, and may generate vibration, a haptic effect, or the like. Although not illustrated, the electronic device 201 may include a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
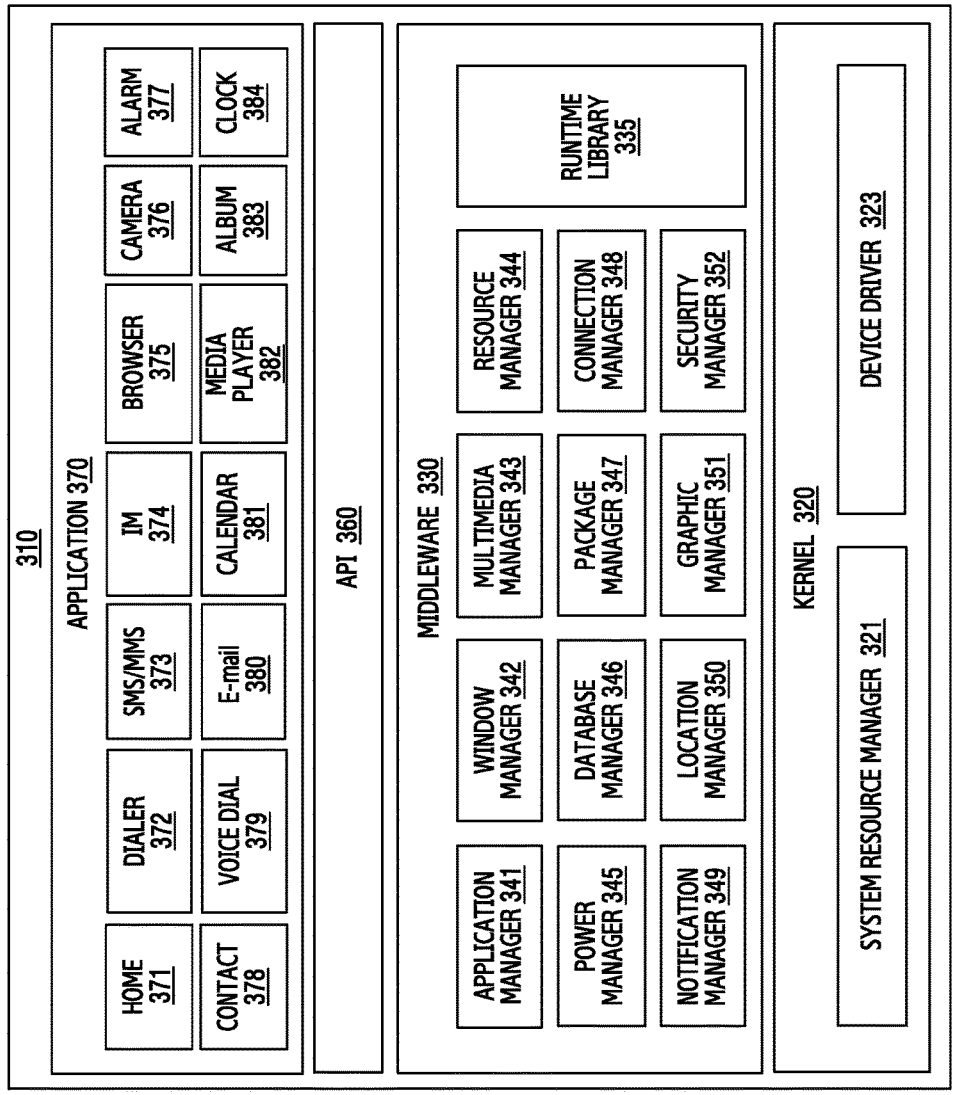
FIG. 3 is a block diagram of a program module according to various embodiments of the present disclosure.

FIG. 3 is a block diagram of a program module according to various embodiments of the present disclosure.

According to an embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

The program module 310 may include a kernel 320, middleware 330, an API 360, and/or an application 370. At least some of the program module 310 may be preloaded on the electronic apparatus, or may be downloaded from an external electronic apparatus (e.g., the electronic devices 102 or 104, or the server 106).

The kernel 320 (e.g., the kernel 141) may include, for example, a system resource manager 321 and/or a device driver 323. The system resource manager 321 may perform the control, allocation, retrieval, or the like of system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, or the like.

The application manager 341 may manage, for example, the life cycle of at least one of the applications 370. The window manager 342 may manage Graphical User Interface (GUI) resources used for the screen. The multimedia manager 343 may determine a format required to reproduce various media files, and may encode or decode a media file by using a coder/decoder (codec) appropriate for the relevant format. The resource manager 344 may manage resources, such as a source code, a memory, a storage space, and the like of at least one of the applications 370.

The power manager 345 may operate together with a Basic Input/Output System (BIOS) to manage a battery or power and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic apparatus. The graphic manager 351 may manage a graphic effect, which is to be provided to the user, or a user interface related to the graphic effect. The security manager 352 may provide various security functions required for system security, user authentication, and the like. According to an embodiment of the present disclosure, when the electronic apparatus (e.g., the electronic device 101) has a telephone call function, the middleware 330 may further include a telephony manager for managing a voice call function or a video call function of the electronic apparatus.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application program 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an embodiment of the present disclosure, the applications 370 may include an application (hereinafter, referred to as an "information exchange application" for convenience of description) supporting information exchange between the electronic apparatus (e.g., the electronic device 101) and an external electronic apparatus (e.g., the electronic devices 102 or 104). The application associated with information exchange may include, for example, a notification relay application for forwarding specific information to an external electronic device, or a device management application for managing an external electronic device.

For example, the notification relay application may include a function of delivering, to the external electronic apparatus (e.g., the electronic devices 102 or 104), notification information generated by other applications (e.g., an SMS/MMS application, an email application, a health care application, an environmental information application, etc.) of the electronic device 101. Further, the notification relay application may receive notification information from, for example, an external electronic device and provide the received notification information to a user.

The device management application may manage (for example, install, delete, or update), for example, a function for at least a part of the external electronic device (for example, the electronic device 102 or 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include applications (for example, a health care application of a mobile medical appliance or the like) designated according to attributes of the external electronic device 102 or 104. According to an embodiment of the present disclosure, the application 370 may include an application received from the external electronic apparatus (e.g., the server 106, or the electronic devices 102 or 104). According to an embodiment of the present disclosure, the application 370 may include a preloaded application or a third party application which can be downloaded from the server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

The module or the program module, according to various embodiments, may: include one or more elements described above; exclude some of them; or further include other elements. The operations performed by the module, the program module, or other elements, according to various embodiments, may be executed in a sequential, parallel, iterative, or heuristic method. In addition, some operations may be executed in a different order, or may be omitted, or other operations may be added. In addition, the embodiments disclosed in the present document are intended for the explanation and understanding of the technical matter, and shall not limit the scope of the technology described in the present document. Accordingly, the scope of the present disclosure should be construed to encompass all modifications or various other embodiments based on the technical concept of the present disclosure.

In addition, the embodiments disclosed in the present document are intended for the explanation and understanding of the disclosed technical matter, and shall not limit the scope of various embodiments of the present document. Therefore, the scope of various embodiments of the present document should be construed to encompass all modifications or various other embodiments based on the technical concept of the various embodiments of the present disclosure.

According to various embodiments of the present disclosure, an electronic device 101 includes a camera, a display 160, a processor 120 coupled to the camera 291 and the display 160, and a memory coupled to the processor 120, wherein the processor 120 when executing instructions stored in the memory is configured to display a preview image obtained from the camera on a first user interface on the display, receive a first input of a user, capture a plurality of images using the camera in response to the first input of the user, for each captured plurality of images, generate data corresponding to a processing of the captured plurality of images, receive a second input of the user during or after the data generation, process at least one of the captured plurality of images based on the generated data in response to the received second input, and display the processed at least one of the captured plurality of images on a second user interface on the display.

The generated data relates to at least one of a user input duration time for capturing the image, a type of an object in the image, a movement information of the electronic device, a blur, a facial expression, and an eyeblink in each of the captured plurality of images.

The generated data includes at least one score generated based on the at least one of the user input duration time for capturing the image, the type of the object in the image, the movement information of the electronic device, the blur, the facial expression, and the eyeblink in each of the plurality of images.

The processor 120 is further configured to select the at least one of the captured plurality of images for processing based in part on the at least one score.

The processor 120 is further configured to display the selected at least one image on the second user interface without an additional user input after the second input is received.

The processor is further configured to display an indication to indicate that the selected at least one image is processed.

The processor is further configured to display an icon corresponding to the camera on the display, receive a user selection for selecting the icon, and display the preview image obtained from the camera on the first user interface on the display using a default setting, in response to the received user selection.

The processor is further configured to display an icon corresponding to the camera on the display, receive a user selection for selecting the icon, display an indicator to indicate that the camera is in an auto mode in response to the received user selection, and display the preview image obtained from the camera on the first user interface on the display using a default setting, in response to the received user selection.

According to various embodiments of the present disclosure, an electronic device 101 includes a camera 291, a display 160, a processor 120 coupled to the camera 291 and the display 160, and a memory 130 coupled to the processor 120, wherein the processor 120 when executing instructions stored in the memory is configured to display an image obtained through the camera on a first user interface on the display, generate data corresponding to a processing of the image by executing a portion of, but not an entirety of, at least one of a plurality of routines for image processing while displaying the image, receive a first user input for capturing the image during or after the data generation, capture the image using the camera in response to the first user input, select at least one of the plurality of routines based on the generated data, and process the captured image by executing a remaining portion of the at least one selected routine.

The processor is further configured to display the processed image on a second user interface on the display.

The generated data relates to at least one of a user input duration time for capturing the image, a type of an object in the image, a movement information of the electronic device, a blur of the image, a facial expression in the image, and an eyeblink in the image.

The generated data includes at least one score generated based on at least one of the user input duration time for capturing the image, the type of the object in the image, the movement information of the electronic device, the blur of the image, the facial expression in the image, and the eyeblink in the image.

The processor is further configured to select the at least one of the plurality of routines based in part on the at least one score.

The processor is further configured to receive a second user input for opening the second user interface, and display the processed image on the second user interface without an additional user input after receiving the second user input.

The processor is further configured to receive a second user input for opening the second user interface, and display an indication to indicate that the captured image is processed on the second user interface without an additional user input after receiving the second user input.

The processor id further configured to display an icon corresponding to the camera on the display, receive a user selection for selecting the icon, and display the image obtained from the camera on the first user interface on the display using a default setting, in response to the received user selection.

The processor is further configured to display an icon corresponding to the camera on the display, receive a user selection for selecting the icon, display an indicator to indicate that the camera is in an auto mode in response to the received user selection, and display the image obtained from the camera on the first user interface on the display using a default setting, in response to the received user selection.

According to various embodiments of the present disclosure, an electronic device 101 includes a camera 291, a display 160, a processor 120 coupled to the camera 291 and the display 160, and a memory 130 coupled to the processor 120, wherein the processor 120 when executing instructions stored in the memory is configured to capture at least one image using the camera, obtain an attribute of the at least one image and generate data related to the attribute, store the at least one image and the generated data, receive a user request for the captured image, and in response to the received user request, perform at least a portion of at least one preset function on the at least one image based on the generated data.

The processor is further configured to perform a remaining portion of the at least one preset function.

The at least one preset function includes at least one of a function to recommend a best photo, a function to select a best face in the at least one image, an eraser function, a panning shot function, and an image processing function for an object in the at least one image.

Figure 4:
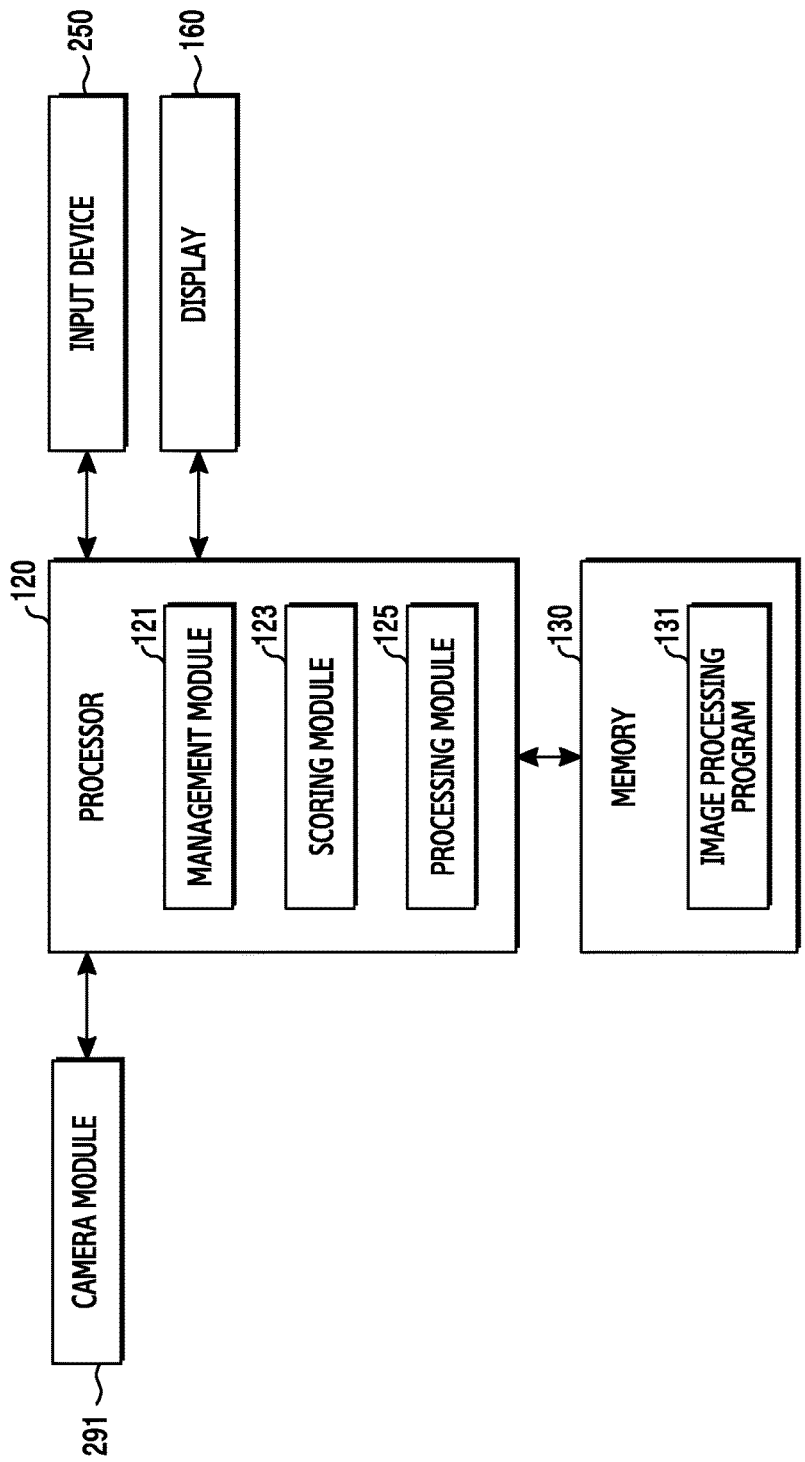
FIG. 4 is a block diagram of an electronic device according to one embodiment of the present disclosure.

FIG. 4 is a block diagram of an electronic device according to one embodiment of the present disclosure.

To the extent description of components in FIG. 4 overlap with the above descriptions for FIG. 2, such description may be omitted.

Referring to FIG. 4, an electronic device 101 can include a camera module 291, a display 160, an input device 250, a memory 130, and a processor 120.

The camera module 291 can acquire an image of a scene under control of the processor 120, for example, when the processor 120 controls the shutter of the camera module 291 to capture an image. As another example, under the control of the processor 120, the camera module 291 may capture a plurality of images, such as successive images, of a scene. As such, under the control of the processor 120, the camera module 291 can capture not only a still image but a moving image.

The display 160 can be implemented using a Liquid Crystal Display (LCD) panel, Organic Light Emitting Diodes (OLED), and the like. But the display 160 is not so limited and may be implemented using any type of suitable technology. The display 160 can be implemented as a touch screen so that the display is layered with the touch panel 252. When the display 160 is implemented as a touch screen, it can output various touch user interfaces under the control of the processor 120, so that the touch panel 252 can sense user's touch input on the touch user interfaces.

Under the control of the processor 120, the display 160 can display an image obtained from the camera module 291 as a preview screen or a live view screen on the displayed user interface.

The display 160 can display an icon corresponding to the camera module 291 on the display, such as on a home screen or a displayed wallpaper. Under the control of the processor 120, in response to a user input for selecting the icon, the display 160 can display, by default, the image obtained from the camera module 291 on the preview screen of a first user interface shown on the display.

Under the control of the processor 120, in response to receiving a user input for selecting the icon, the display 160 can display an item, such as an indicator, indicating that the camera is in an auto mode. In response to the user input for selecting the displayed icon, the display 160 can display, by default, the image obtained from the camera module 291 on the preview screen of the first user interface shown on the display.

Under the control of the processor 120, the display 160 can process a plurality of captured images on the user interface and then display at least one, such as a representative image, of the captured images. Under the control of the processor 120, the display 160 can display an indication that the displayed image is the representative image.

The input device 250 can be implemented using a key panel including various control keys for receiving user manipulation, or a touch panel for receiving user touch, or the like. When the input device 250 is implemented with the touch panel in connection with a touch screen, the input device 250 can generate an electric signal corresponding to a user manipulation input and provide the electric signal to the processor 120.

The input device 250, if implemented with a key panel, can be disposed in a part of a housing of the electronic device and include an input button for receiving the user input for the image capturing.

The memory 130 can be implemented using various memories, including volatile or non-volatile memories. For example, the memory 130 for storing the captured image can be realized using various memory cards such as CompactFlash (CF) card, Secure Digital (SD) card, xD card, and so on.

The memory 130 can store data and instructions for processing a plurality of images. The memory 130 can store the data for processing the images (hereafter, referred to as image processing data) as, but not limited to, metadata or Exchangeable Image File Format (EXIF) data.

The memory 130 can store at least one image captured by the camera module 291 and image processing data of the at least one captured image. According to another embodiment, the memory 130 can store the image processing data separately from the captured image. For example, the image processing data can be stored in a separate memory and a correspondence (or map or link) between the image processing data and the captured image may also be stored.

The memory 130 can also store an image processing program 131. The image processing program 131 can include a plurality of routines for the image processing. The routines can implement a plurality of image processing techniques. For example, such routines can include, but not limited to, routines of a function to suggest a best photo, a function to suggest a best face in an image, an eraser function, a panning shot function, a food function (e.g., a function for recognizing food as an object and emphasizing hue, brightness, and contrast of the food), and a beauty face function (e.g., a function for recognizing a face and removing blemishes or adjusting a face tone).

The memory 130 can execute a portion of, but not the entirety of, at least one of the routines and store the generated processed image.

The processor 120 can include a management module 121, a scoring module 123, and a processing module 125.

The management module 121 can manage a flow (or a schedule) of the image processing. For example, the management module 121 can perform scheduling for the image processing. For example, while or after capturing an image or while storing a plurality of captured images, the management module 121 can schedule data generation for the image processing.

According to another embodiment, while or after capturing an image or while storing a plurality of captured images, the management module 121 can schedule data generation for the image processing in a background process of the processor 120.

The scoring module 123 can analyze at least one image and score the image based on the analysis.

For example, in the function to suggest a best photo, at least one of a blur, a facial expression, and an eyeblink in each image can be scored. The image processing data can include, for example, a score of at least one of the blur, the facial expression, and the eyeblink in each image.

The processing module 125 can process the captured images based on the image processing data, including the generated score.

The processing module 125 can select at least one of the captured images based on the score in the image processing data. For example, the processing module 125 can add up scores and select a representative image from the images based on the sum, or compare the scores and select a representative image based on the comparison.

Those skilled in the art shall easily understand that the construction and the operations of the processor 120 can be embodied variously according to embodiments of the present disclosure.

Now, the functions of the processor 120 are explained by referring to FIGS. 5 through 15.

The structure of the electronic device 101 is merely exemplary in FIG. 4, and accordingly some embodiments, the components in FIG. 4 may be omitted or changed, and another component may be added. For example, the electronic device 101 can further include an acceleration sensor (e.g., the acceleration sensor 240E), a gyro sensor (e.g., the gyro sensor 240B), and so forth, for detecting a movement of the electronic device 101.

Figure 5:
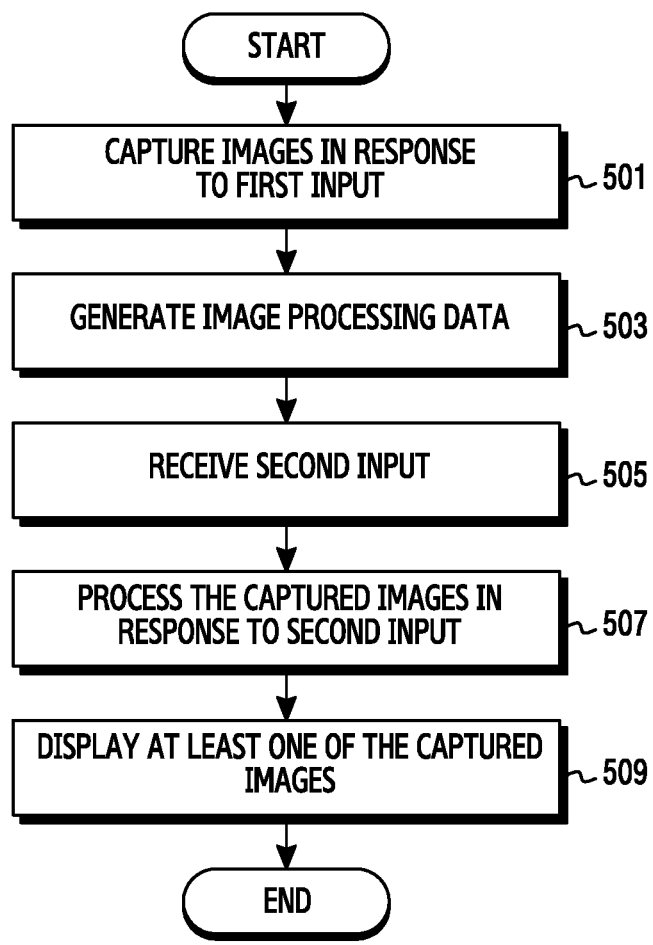
FIG. 5 is a flowchart of a method for processing an acquired image according to one embodiment of the present disclosure.

FIG. 5 is a flowchart of a method for processing an acquired image according to one embodiment of the present disclosure.

In operation 501, an electronic device (e.g., the processor 120) can capture a plurality of images in response to a user input.

In one embodiment, the electronic device (e.g., the processor 120) can display an image obtained from the camera module 291 as a preview image or the live view screen on the user interface displayed on the display 160. The electronic device (e.g., the processor 120) can receive a first user input (hereafter, referred to as the first input) for image capturing. For example, the first input may be inputted through the input button disposed in part of the housing of the electronic device. As another example, the first input may be a touch input inputted through the touch panel 252.

In one embodiment, the electronic device (e.g., the processor 120) can display the icon corresponding to the camera module 291 on the display 160, such as on the home screen or the wallpaper screen. In response to receiving user input for selecting the camera icon, the electronic device can display, by default, the image obtained from the camera module 291 on the preview screen of the first user interface on the display 160.

In another embodiment, the electronic device (e.g., the processor 120) can display an icon corresponding to the camera on the display 160, such as on the home screen or the wallpaper screen. In response to receiving user input for selecting the camera icon, the electronic device (e.g., the processor 120) can display an indicator indicating that the camera is in auto mode. In response to the user input for selecting the displayed camera icon, the electronic device (e.g., the processor 120) can display, by default, the image obtained from the camera module 291 on the preview screen of the first user interface on the display 160.

In one embodiment, the electronic device (e.g., the processor 120) can acquire one or more images using the camera module 291. For example, using the camera module 291, the electronic device (e.g., the processor 120) can acquire an image of a scene or a plurality of images through a shutter operation. For example, the electronic device (e.g., the processor 120) can acquire a plurality of images, such as successive images, of a scene using the camera module 291. For example, the electronic device (e.g., the processor 120) can obtain not only a still image but a moving image using the camera module 291.

In operation 503, the electronic device (e.g., the processor 120) can generate data for processing the images.

In one embodiment, the image processing can include at least a part of at least one function. The functions may include a function for recommending one image or a representative image from the obtained images (hereafter, this function may be referred to as the best photo function), a function for selecting one of face images successively captured and applying the selected face image to all of the images (hereafter this function may be referred to as the best face function), a function for deleting at least one of the successive images (hereafter this function may be referred to as the eraser function), and a function for focusing on a moving object and capturing the object while moving at the same speed as the object (hereafter this function may be referred to as the panning shot function).

In one embodiment, in the best photo function, the image processing data can be generated based at least on the blur, the facial expression, and/or the eyeblink in each image.

In one embodiment, the electronic device (e.g., the scoring module 123) can perform the scoring operation. For example, in the best photo function, the scoring operation can score based on the blur, the facial expression, and/or the eyeblink in each image.

In one embodiment, in the best photo function, the image processing data can include the score based on the blur, the facial expression, and/or the eyeblink in each image.

In one embodiment, the electronic device (e.g., the processor 120) can store the image processing data.

The scoring operation and the storing operation are explained further below by referring to FIG. 6.

In operation 505, while or after generating the image processing data, the electronic device (e.g., the processor 120) can obtain (or receive) a user input (hereafter, referred to as a second input) via the input button and/or the display 160.

In one embodiment, while or after capturing an image or while storing a plurality of captured images, the electronic device (e.g., the management module 121) can generate image processing data based on some analysis of the captured images. In another embodiment, while or after capturing an image or while storing a plurality of captured images, the electronic device (e.g., the management module 121) can generate image processing data based on some processing of the captured images in a background process of the processor 120.

In one embodiment, the electronic device (e.g. the management module 121) can schedule the image processing. For example, while or after capturing an image or while storing a plurality of captured images, the electronic device (e.g., the processor 120) can schedule image processing and data generation.

In one embodiment, the second input can include a user input (e.g., a touch input) for requesting to display a captured image as a thumbnail image or a full image on the display 160. In another embodiment, the second input can include a user input for executing a separate image view application.

In operation 507, in response to the received second input, the electronic device (e.g., the processing module 125) can process the captured images based on the image processing data.

In one embodiment, the electronic device (e.g., the processing module 125) can select at least one of the captured images based on one score of the image processing data. For example, the electronic device (e.g., the processing module 125) can add up scores generated from the plurality of captured images and select a representative image from the images based on the sum, or compare the scores and select a representative image based on the comparison.

In operation 509, the electronic device (e.g., the processor 120) can display at least one of the processed images on the user interface.

In one embodiment, the electronic device (e.g., the processor 120) can receive the second input and then display the selected image on the user interface without an additional user input in operation 509.

In one embodiment, the electronic device (e.g., the processor 120) can receive the second input and then display an indication for the selected image on the user interface without an additional user input.

Figure 6:
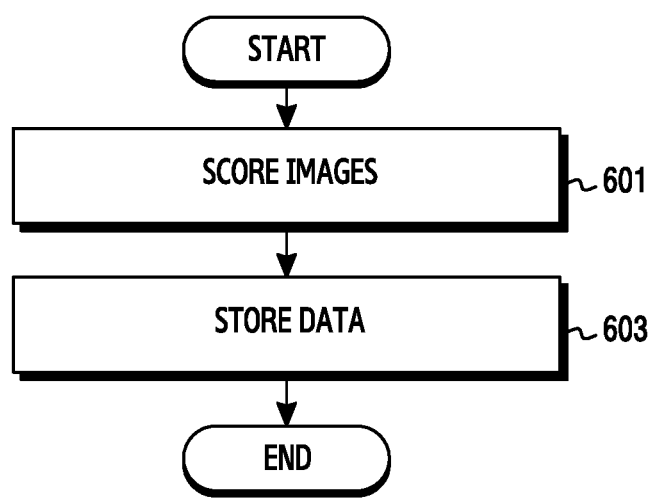
FIG. 6 is a flowchart of a method for generating data for processing a plurality of images according to one embodiment of the present disclosure.

FIG. 6 is a flowchart of a method for generating data for processing a plurality of images according to one embodiment of the present disclosure.

In operation 601, an electronic device (e.g. the scoring module 123) can score a plurality of images.

In one embodiment, the image processing data that includes the scores can include an analysis result of the images. For example, the electronic device can acquire information for selecting an optimal image from a plurality of images acquired by the camera module by analyzing the plurality of images. The electronic device (the scoring module 123) can analyze the plurality of images and score the images based on the analysis result. The image processing data can include the score of at least one of the blur, the facial expression, and the eyeblink in each image.

In other words, in one embodiment, at least one of the blur, the facial expression, and the eyeblink in each image can be scored.

For example, the electronic device (e.g., the scoring module 123) can score the images according to a blurring level. For example, the electronic device (the scoring module 123) can give a higher score for a lower blurring level.

In another embodiment, the electronic device (e.g., the scoring module 123) can score the images at least based on the facial expressions captured in the images. For example, the electronic device (e.g., the processor 120) can give the higher score to a smiling face captured in the images, where the images also capture neutral faces, frowning faces, angry faces, and sad faces.

In yet another embodiment, the electronic device (e.g., the scoring module 123) can score the image at least based on the eyeblink. For example, the electronic device (e.g., the processor 120) can detect eyeblinks based on the size of the eyes captured in the images and provide a higher score if eyeblinks are not detected.

In still another embodiment, the electronic device (e.g., the scoring module 123) can score an object (or an object type) in the image. For example, the electronic device (e.g., the processor 120) can calculate (or score) a probability that the acquired image includes a predefined object using at least one recognition module. For example, using a face recognition module or a food recognition module, the electronic device (e.g., the scoring module 123) can calculate (or score) a probability that the acquired image includes a face or food.

In a further embodiment, the electronic device 101 can score its movement information. For example, the electronic device (e.g., the scoring module 123) can detect its movement using the acceleration sensor (e.g., the acceleration sensor 240E) or the gyro sensor (e.g., the gyro sensor 240B), and score the detected movement. For example, the electronic device (e.g., the processor 120) can give a higher score for less movement.

In operation 603, the electronic device (e.g., the processing module 125) can store the image processing data.

In one embodiment, the image processing data can be stored in the metadata format or the EXIF format. However, the present disclosure is not so limited.

In one embodiment, the electronic device (e.g., the processing module 125) can store the at least one acquired image and the image processing data of the at least one acquired image.

In one embodiment, when the captured image is stored in the Joint Photographic Coding Experts Group (JPEG) format, the image processing data can be contained in a header area of a JPEG file. For example, the image processing data can be contained in an application data area of the JPEG file of the acquired image. The image processing data or the acquired image data is not limited to the JPEG format, and can adopt various formats such as Tagged Image File Format (TIFF) or Graphics Interchange Format (GIF).

In another embodiment, the image processing data can be stored separately from the acquired image. For example, the image processing data can be stored in the separate memory 130, but another data structure, such as a table, can store the correspondence (to map or to link) the image processing data to the captured image.

In one embodiment, the electronic device (e.g., the processing module 125) can temporarily store the at least one acquired image and the image processing data of the at least one acquired image. For example, the electronic device (e.g., the processor 120) can temporarily store the at least one acquired image and abstract data of the at least one acquired image, and store the processed images in the memory 130 in response to the second input.

Figure 7:
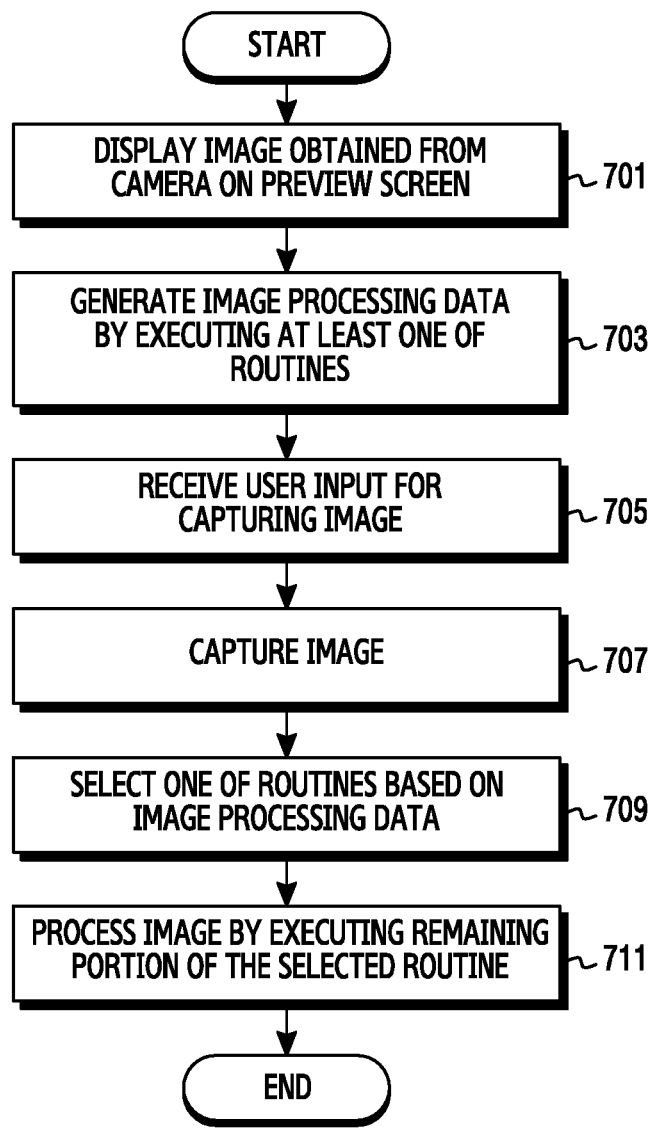
FIG. 7 is a flowchart of a method for processing an acquired image according to one embodiment of the present disclosure.

FIG. 7 is a flowchart of a method for processing an acquired image according to one embodiment of the present disclosure.

In operation 701, the electronic device (e.g., the processor 120) can display an image obtained from a camera (or the camera module 291) as the preview screen or the live view screen on the user interface displayed on the display 160.

In one embodiment, the electronic device (e.g., the processor 120) can display an image obtained from the camera module 291 as the preview screen or the live view screen on the user interface displayed on the display 160.

In one embodiment, the electronic device (e.g., the processor 120) can display an icon corresponding to the camera module 291 on the display 160, such as on the home screen or the wallpaper screen. In response to receiving user input for selecting the icon, the electronic device can display, by default, the image obtained from the camera module 291 on the preview screen or the live view screen of the first user interface on the display 160.

In another embodiment, the electronic device (e.g., the processor 120) can display an icon corresponding to the camera on the display 160, such as on the home screen or the wallpaper screen. In response to receiving user input for selecting the icon, the electronic device (e.g., the processor 120) can display an indicator indicating that the camera is in the auto mode. The electronic device (e.g., the processor 120) can also display, by default, the image obtained from the camera module 291 on the preview screen or the live screen of the first user interface on the display 160.

In operation 703, the electronic device (e.g., the processor 120) can generate image processing data by executing a portion of, but not the entirety of, at least one of the routines for image processing.

In one embodiment, the routines for image processing can employ a plurality of image processing techniques. For example, the routines can include, but not limited to, the routines of the function to suggest a best photo, the function to suggest a best face in an image, the eraser function, the panning shot function, the food function (e.g., a function for recognizing food as an object and emphasizing hue, brightness, and contrast of the food), and the beauty face function (e.g., a function for recognizing a face and removing blemishes or adjusting a face tone).

In one embodiment, the electronic device (e.g., the management module 121) can execute a routine for determining an object (or an object type) while displaying the preview screen, as a portion of, but not the entirety of, at least one of the routines. For example, the electronic device (e.g., the management module 121) can execute a portion or a sub-routine of the food function. The electronic device (e.g., the scoring module 123) can score the object in the acquired image using the object recognition module. For example, in the food function, the electronic device (e.g., the scoring module 123) can score a probability of recognizing a certain food item. As another example, the electronic device (e.g., the scoring module 123) can score a probability of recognizing the face using the face recognition module.

In one embodiment, the image processing data can be related to several other factors, including the user's input duration time for the image capturing, the object type in the image, the movement information of the electronic device, the image blur of the image, a detected facial expression in the image, and a detected eyeblink in the image.

In another embodiment, the image processing data can include scores of the user's input duration time for the image capturing, the object type in the image, the movement information of the electronic device, the image blur of the image, a detected facial expression in the image, and/or a detected eyeblink in the image.

After generating the image processing data, the electronic device (e.g., the processing module 125) can receive a user input for the image capturing in operation 705.

In one embodiment, the electronic device (e.g., the processing module 125) can receive the user input for the image capturing via the input button disposed in a part of the housing and/or a soft touch input button displayed on the display 160.

In operation 707, the electronic device (e.g., the processing module 125) can capture an image using the camera (or the camera module 291) in response to the user input.

In one embodiment, the electronic device (e.g., the processor 120) can acquire one or more images using the camera module 291. For example, using the camera module 291, the electronic device (e.g., the processor 120) can acquire an image by operating the shutter of the camera. For example, the electronic device (e.g., the processor 120) can acquire a plurality of images (or successive images) using the camera module 291. For example, the electronic device (e.g., the processor 120) can obtain not only a still image but a moving image using the camera module 291.

In operation 709, the electronic device (e.g., the processing module 125) can select at least one of the routines at least based on the image processing data.

For example, the electronic device (e.g., the processing module 125) can select the routine for executing the food function among the multiple routines at least based on the score of the probability of recognizing the food. For example, the electronic device (e.g., the processing module 125) can select the routine for executing the face function among the multiple routines at least based on the score of the probability of recognizing the face. These are only two examples for an embodiment of the present disclosure and the present disclosure is not so limited.

In operation 711, the electronic device (e.g., the processor 120) can process the image by executing the remaining portion of the selected routine.

For example, after selecting the routine for executing the food function among the multiple routines, to execute the food function, the electronic device (e.g., the processor 120) can process the image by emphasizing the hue, the brightness, and the contrast of an image area corresponding to the food in the image.

As another example, after selecting the routine for executing the face function among the multiple routines, to execute the face recognition, the electronic device (e.g., the processor 120) can process the image by brightening a tone or removing a blemish in an image area corresponding to the face in the image.

Although not depicted in FIG. 7, the method of FIG. 7 can further include displaying an image processing result. For example, the electronic device (e.g., the processor 120) can receive a user input for opening the user interface to display the image processing result. Next, the electronic device (e.g., the processor 120) can display the processed image on the opened user interface without an additional user input.

For example, the electronic device (e.g., the processor 120) can receive a user input for opening the user interface to display the image processing result. Next, the electronic device (e.g., the processor 120) can display the processed image along with an indication to indicate that the image has been processed on the user interface without an additional user input.

Figure 8:
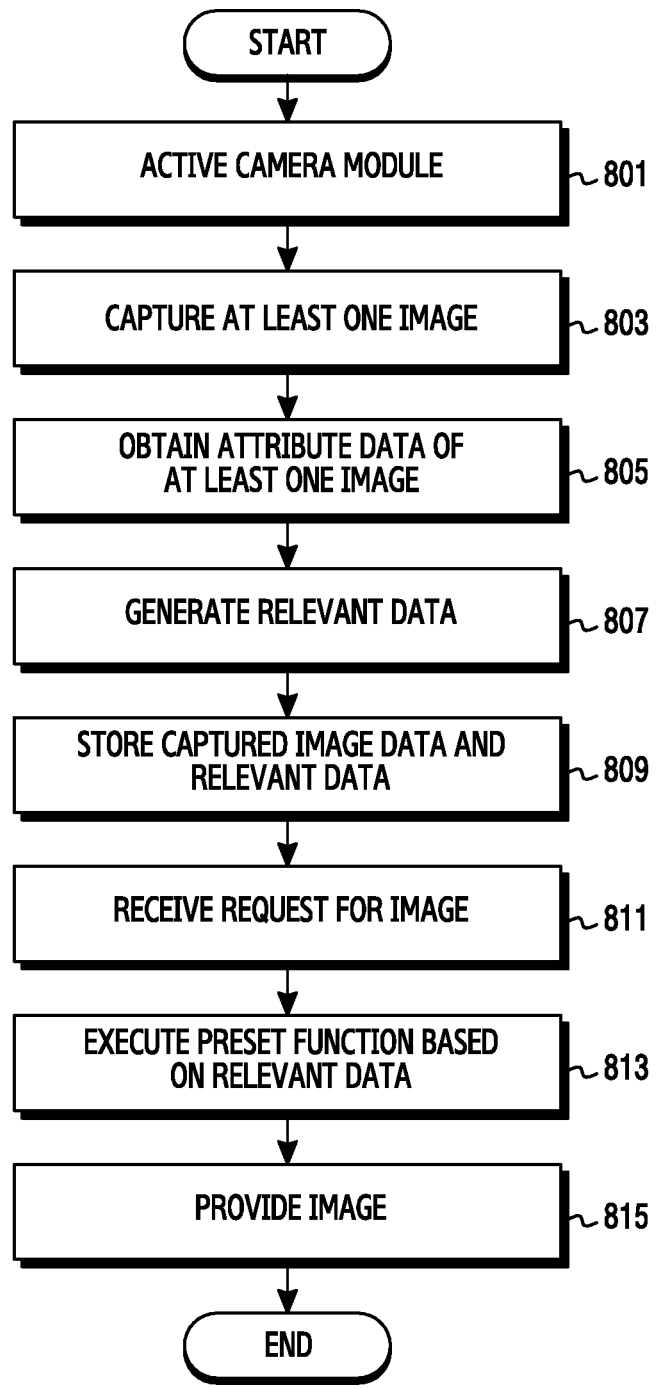
FIG. 8 is a flowchart of an image processing method according to one embodiment of the present disclosure.

FIG. 8 is a flowchart of an image processing method according to one embodiment of the present disclosure.

In operation 801, the electronic device (e.g., the processor 120) can activate the camera module 291. For example, after receiving a user input for executing a camera application, the electronic device can drive the camera module 291.

In operation 803, the electronic device (e.g., the processor 120) can capture at least one image using the camera module 291. For example, the electronic device (e.g., the processor 120) can acquire the image using the camera module 291 and display the acquired image in on the display 160, for example in a preview screen.

The electronic device (e.g., the processor 120) can acquire one or more images using the camera module 291. For example, using the camera module 291, the electronic device (e.g., the processor 120) can acquire an image by operating the shutter of the camera module 291. For example, the electronic device (e.g., the processor 120) can acquire a plurality of images (or successive images) using the camera module 291.

In operation 805, the electronic device (e.g., the processor 120) can obtain attribute information of at least one of the captured images. For example, to execute at least a portion of the best photo function or the best face function, the electronic device (e.g., the processor 120) can obtain attribute information, for example, sharpness information of a scene or an object in the scene. For example, to determine the sharpness, the electronic device (e.g., the processor 120) can obtain contrast information of the acquired image. As another example, the electronic device (e.g., the processor 120) can also obtain brightness information or chroma information as the attribute of the acquired image.

In another embodiment, to execute the routine of the best face function, when an object in the acquired image is recognized as a face, the electronic device (e.g., the processor 120) can obtain information about a blur, a facial expression, or an eyeblink.

For example, to execute at least a portion of the eraser function, the electronic device (e.g., the processor 120) can obtain information of a moving object and a stationary object.

For example, to execute at least a portion of the panning shot function, the electronic device (e.g., the processor 120) can obtain information about a moving object and a scene background.

In operation 807, the electronic device (e.g., the processor 120) can generate data (hereafter, referred to as relevant data) relating to the images acquired using the camera module 291 based on the obtained attributes.

In one embodiment, the electronic device (e.g., the processor 120) can generate relevant data while capturing at least one image. In another embodiment, the electronic device (e.g., the processor 120) can capture at least one image and then generate relevant data while storing the image.

In one embodiment, the electronic device (e.g., the scoring module 123) can score the image based on the obtained attributes, and the scores may be included in the relevant data. The captured image or an object in the image may be scored. For example, the electronic device (e.g., the scoring module 123) can score the image based on the attribute of the image or objects in the image, such as the sharpness of the image. To determine the sharpness, the electronic device (e.g., the scoring module 123) can score for example the contrast of the acquired image. As another example, the electronic device (e.g., the scoring module 123) can score the brightness or the chroma as the attribute of the acquired image.

In various embodiments, to execute at least a portion of the best photo function, the electronic device (e.g., the scoring module 123) can score at least one of the contrast, the brightness, and the chroma of each image. The electronic device (e.g., the scoring module 123) can weigh at least one of the contrast, the brightness, and the chroma. The electronic device (e.g., the scoring module 123) can score at least one of the contrast, the brightness, and the chroma of each image, and sum the scores. The electronic device (e.g., the processor 120) can set a flag based on the score sum. For example, the electronic device (e.g., the scoring module 123) can set a flag '1' for the best photo and a flag '0' for the other images.

In another example, to execute at least a portion of the best face function, after recognizing a face in each of the images, the electronic device (e.g., the scoring module 123) can score at least one of a blur, a facial expression, and an eyeblink in each image. The electronic device (e.g., the processor 120) can weigh at least one of a blur, a facial expression, and an eyeblink in each image. The electronic device (e.g., the scoring module 123) can score at least one of a blur, a facial expression, and an eyeblink in each image, and sum the scores. The electronic device (e.g., the scoring module 123) can set a flag based on the summed scores. For example, the electronic device (e.g., the scoring module 123) can set a flag '1' for the best (or representative) face of the face images and a flag '2' for the other face images.

In another example, to execute at least a portion of the eraser function, the electronic device (e.g., the scoring module 123) can score a moving object and a stationary object in the capture images. For example, the electronic device (e.g., the scoring module 123) can score movement of at least one object in each of the captured images. The electronic device (e.g., the scoring module 123) can score the movement of the object in each of the images, and sum the scores. The electronic device (e.g., the scoring module 123) can set a flag based on the summed scores. For example, the electronic device (e.g., the scoring module 123) can set a flag '1' for the object in the image that has a movement over a preset value and a flag '2' for the object in the image that has a movement below the preset value.

In another example, to execute at least a portion of the panning shot function, the electronic device (e.g., the scoring module 123) can score a moving object in each of the images. For example, the electronic device (e.g., the scoring module 123) can score movement (or relative object movement against the background of the images) of at least one object in each of the images.

In operation 809, the electronic device (e.g., the processor 120) can store the captured image data and the relevant data.

When the captured image is stored in the JEPG format, the relevant data can be contained in, but not limited to, the header area of the JPEG file. For example, the relevant data can be contained in, the application area of the JPEG file of the acquired image. The format of the relevant data or the acquired image data is not limited to the JPEG and can adopt various formats such as TIFF or GIF, or any other suitable format.

In another embodiment, the relevant data can be stored separately from the captured image. For example, the relevant data can be stored in the separate memory 130, but another data structure, such as a table, can store the correspondence (or map or link) between the relevant data and the captured image.

In one embodiment, the electronic device (e.g., the processor 120) can temporarily store the at least one acquired image and the relevant data of the at least one acquired image. For example, the electronic device (e.g., the processor 120) can temporarily store the at least one acquired image and the relevant data of the at least one acquired image, and store in the memory 130 the image which is changed or applied with an effect after the preset function is accomplished.

In operation 811, the electronic device (e.g., the processor 120) can receive a request to provide the at least one acquired image. For example, the electronic device (e.g., the processor 120) can receive a user input for requesting to provide the at least one acquired image. The electronic device (e.g., the processor 120) can store the at least one acquired image and provide the at least one stored image as a thumbnail, or as a full image. The electronic device (e.g., the processor 120) can receive a user input (e.g., a touch input to the thumbnail image) for requesting to provide the captured image. In another embodiment, the electronic device (e.g., the processor 120) can execute a separate image view application (or a view program) and receive a user input for requesting to provide the at least one acquired image.

In operation 813, the electronic device (e.g., the processor 120) can execute a preset function at least based on the relevant data. For example, the electronic device (e.g., the processor 120) can execute at least one preset function at least based on the relevant data, the relevant data may include information about the execution result of the portion of the preset function already executed.

In one embodiment, as for the best photo function, the electronic device (e.g., the processing module 125) can select an image (or a representative image) of the highest quality from the multiple images based on scores of at least one of the contrast, the brightness, and the chroma of images. In another embodiment, the electronic device (e.g., the processing module 125) can select an image of the highest quality according to a flag value of each image. For example, the electronic device (e.g., the processing module 125) can select an image of the flag value '1' as the highest-quality image (or the representative image) among the multiple images.

In another embodiment, as for the best face function, the electronic device (e.g., the processing module 125) can select a face (or a representative face) of the highest quality from multiple face images based on scores of at least one of the blur, the facial expression, and the eyeblink in the images. In another embodiment, the electronic device (e.g., the processing module 125) can select an image of the highest quality according to a flag value of the face images. For example, the electronic device (e.g., the processing module 125) can select a face image of the flag value '1' as the highest-quality image among the face images.

In another embodiment, as for the eraser function, the electronic device (e.g., the processing module 125) can select an image to delete based on the scores of the moving object and the stationary object. For example, the electronic device (e.g., the processing module 125) can select the image portion that includes an object moving over a preset value as the image portion to delete.

In another embodiment, as for the panning shot function, the electronic device (e.g., the processing module 125) can motion-blur the background of the image excluding the object moving over the preset value based on the score of the moving object in the image.

In operation 815, the electronic device (e.g., the processor 120) can provide the image.

In one embodiment, the electronic device (e.g., the processor 120) can provide at least one image by executing (or applying) the best photo function, the best face function, the eraser function, and the panning shot function.

Figure 9A:
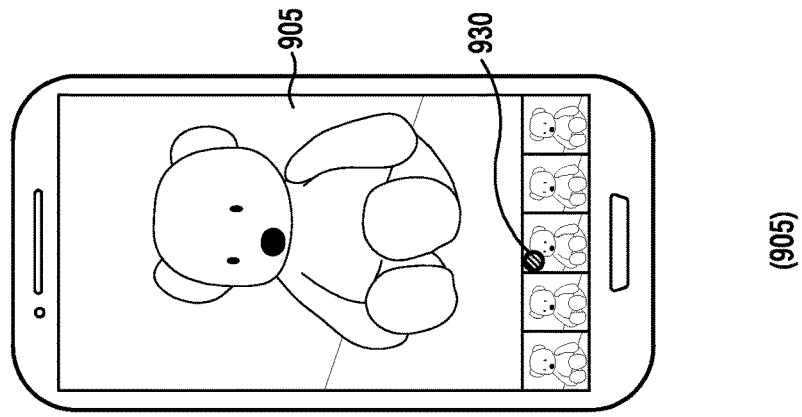
FIG. 9A and FIG. 9B are diagrams of an image processing method for a best photo function according to one embodiment of the present disclosure.
Figure 9A:
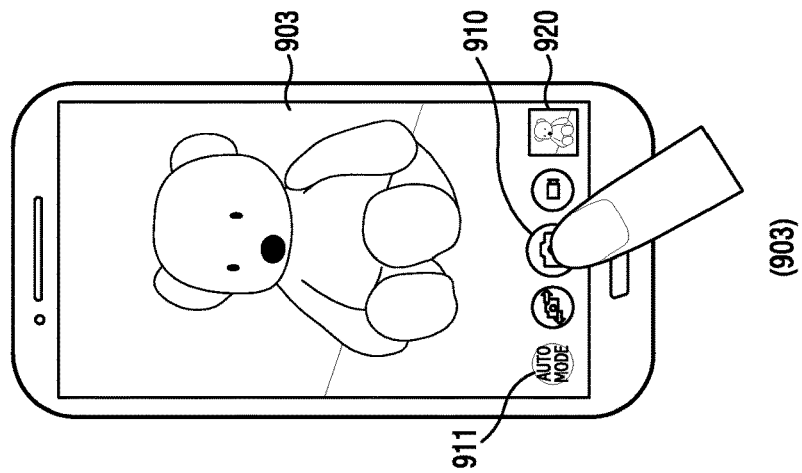
Figure 9A:
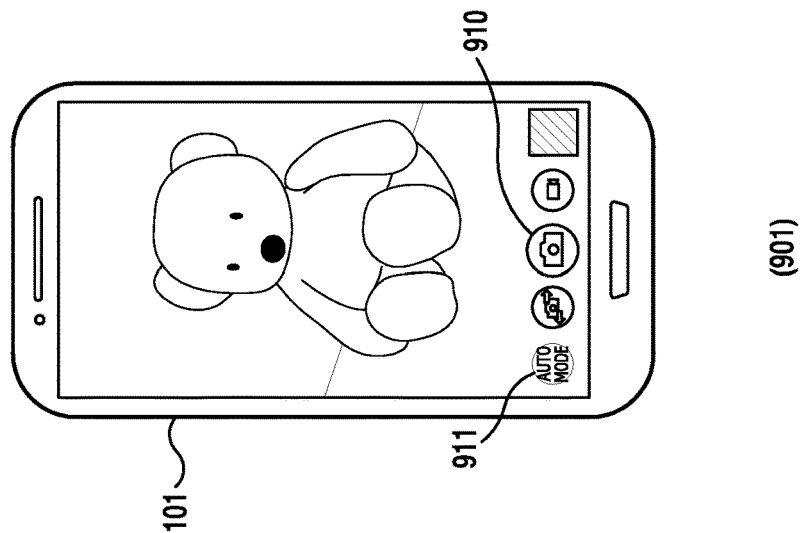
Figure 9B:
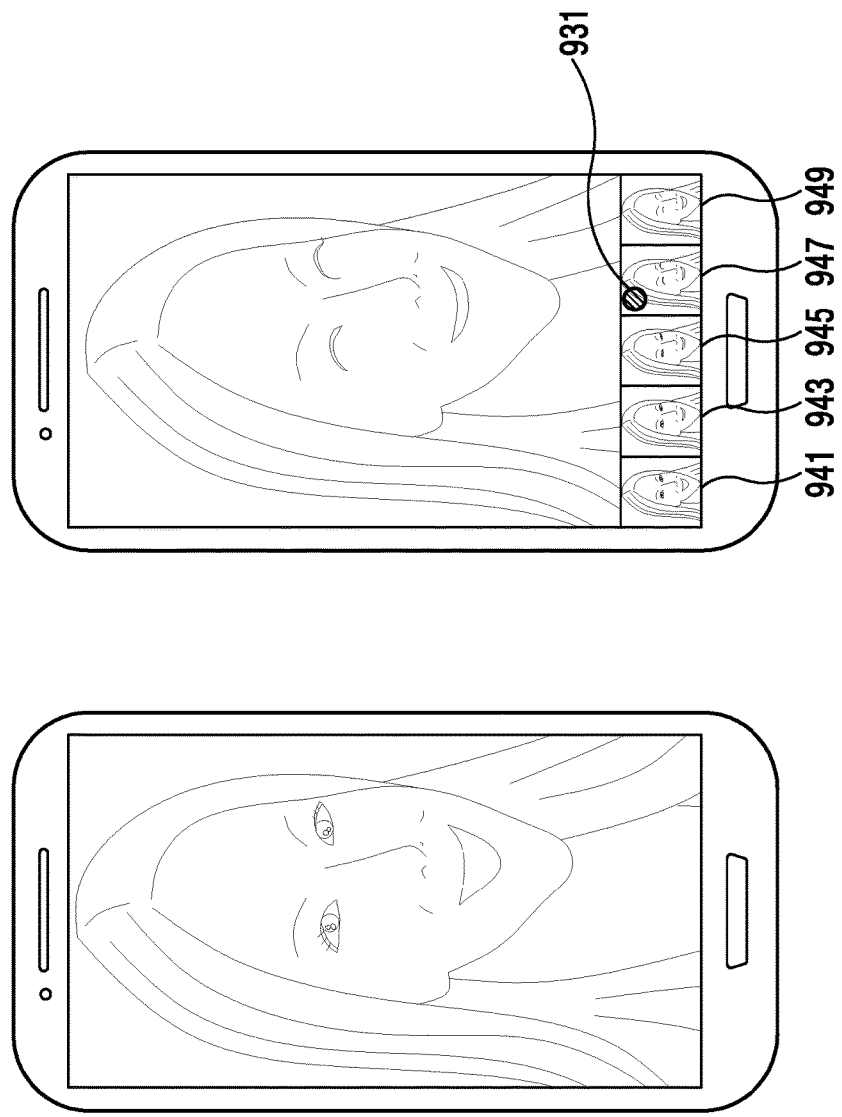

FIGS. 9A and 9B depict an image processing method for a best photo function according to one embodiment of the present disclosure.

Referring to FIGS. 9A and 9B, a screen 901 of FIG. 9A provides a preview of an image. When the user executes the camera application, the electronic device 101 can display the preview screen in the auto mode. As shown in FIG. 9A, the preview screen can display an item 911 indicating the auto mode.

When the user touches a camera button 910 (or a shutter button), the electronic device 101 can capture a scene 903 as shown in FIG. 9A. The electronic device 101 can acquire one image by receiving one touch on the camera button 910. In another embodiment, the electronic device 101 can acquire a plurality of images in proportion to a touch duration time on the camera button.

While capturing a scene or storing a captured image, the electronic device (e.g., the management module 121) can generate relevant data. For example, as the electronic device obtain a plurality of images, the electronic device (e.g., the scoring module 123) can also obtain sharpness information of each image and score the sharpness of the images. For example, the electronic device (e.g., the management module 121) can set the flag for each image at least based on the scores. For example, the electronic device (e.g., the management module 121) can set the flag '1' for the image (or the representative image) of the highest score and the flag '0' for the other images.

The electronic device 101 can store the acquired image and the relevant data. Next, the electronic device 101 can provide a thumbnail image 920 of the captured images 930 as shown in FIG. 9A.

When a request to provide the captured image is received, for example, when the user touches the thumbnail image 920 of the captured photo, the electronic device 101 can provide a representative image 905 as shown in FIG. 9A. The electronic device 101 can provide the representative image and thumbnail images corresponding to the images. The electronic device 101 can provide an indication 930 indicating the representative image on the thumbnail image of the representative image among the thumbnail images.

Referring to FIG. 9B, during or after the image capturing, the electronic device (e.g., the processor 120) can score a face and an image. For example, the electronic device (e.g., the processor 120) can score at least one of a blur, a facial expression, and an eyeblink in each of the obtained images.

The electronic device (e.g., the processor 120) can display a plurality of thumbnail image 941 through 949 in one side of a screen as shown in FIG. 9B. The electronic device (e.g., the processor 120) can display an indication 931 of the thumbnail image of a representative image among the thumbnail image 941 through 949. In another embodiment, the electronic device (e.g., the processing module 125) can display the representative image in a thumbnail that is bigger than the other thumbnails. Yet, the image displayed as the biggest thumbnail is not limited to the representative image. For example, the electronic device (e.g., the processor 120) may display of the first captured image of the images as the biggest thumbnail.

Figure 10A:
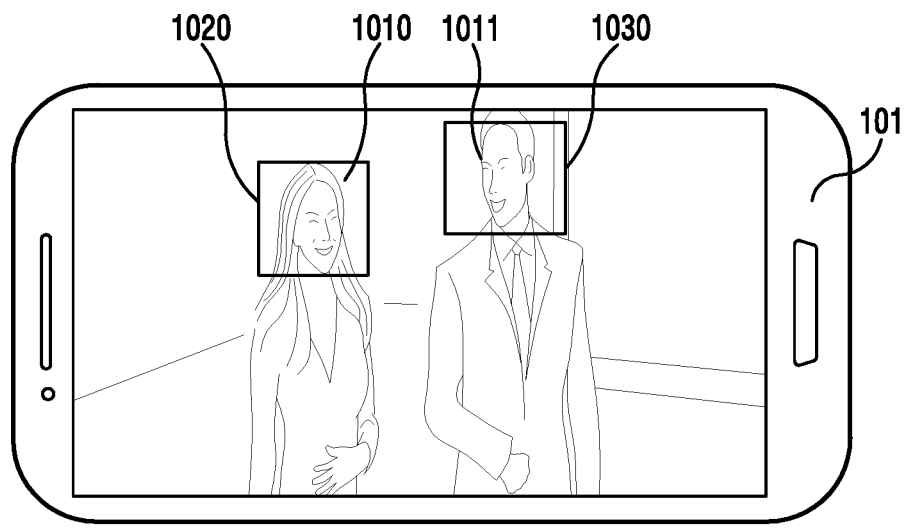
FIG. 10A and FIG. 10B are diagrams of an image processing method for a best face function according to one embodiment of the present disclosure.
Figure 10B:
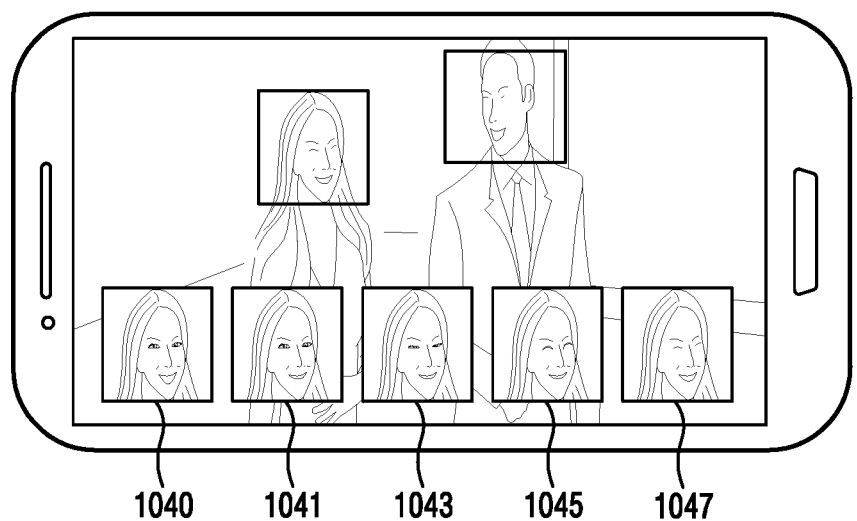

FIGS. 10A and 10B depict an image processing method for a best face function according to one embodiment of the present disclosure.

A screen of FIG. 10A provides a preview of an image. As shown in FIG. 10A, the electronic device can provide focus areas 1020 and 1030 on objects, for example, on faces 1010 and 1011.

The electronic device 101 can capture an image including an object or a plurality of images. For example, the electronic device 101 can obtain a plurality of images in proportion to a touch duration time on the camera button.

While capturing the images or storing a captured image, the electronic device (e.g., the management module 121) can generate relevant data. For example, as the electronic device is acquiring a plurality of images, the electronic device (e.g., the scoring module 123) can also score at least one of a blur, a facial expression, and an eyeblink in the images. For example, the electronic device (e.g., the management module 121) can set the flag for a face image in the images at least based on the scores. For example, the electronic device (e.g., the management module 121) can set the flag '1' for the face image (or the representative image) of the highest score and the flag '0' for the other images.

When receiving a request to provide the captured image, the electronic device 101 can select a face image of the highest score and apply the selected face image to the background image. The electronic device 101 can provide thumbnail face images 1040 through 1047 of the images. When the user selects at least one of the thumbnail face images 1040 through 1047, the electronic device 101 can apply the selected face image to the background image.

Figure 11A:
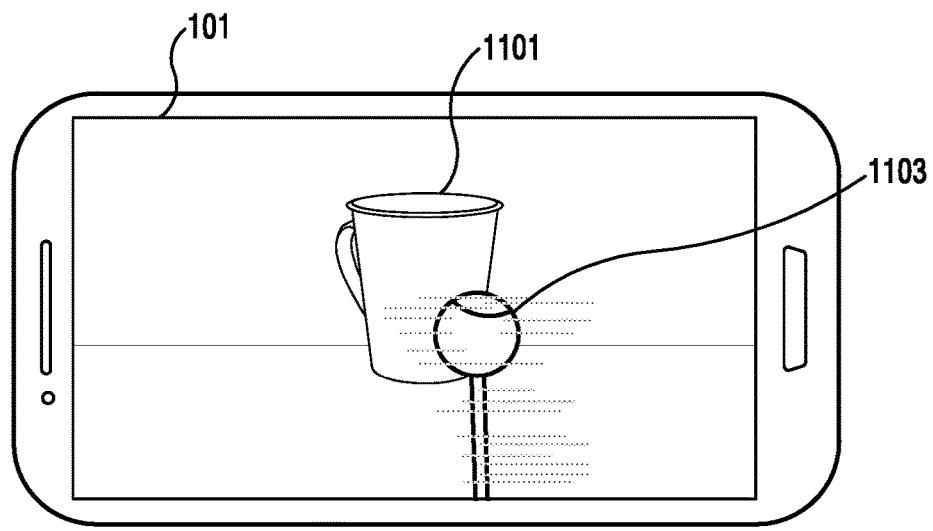
FIG. 11A and FIG. 11B are diagrams of an image processing method for an eraser function according to one embodiment of the present disclosure.
Figure 11B:
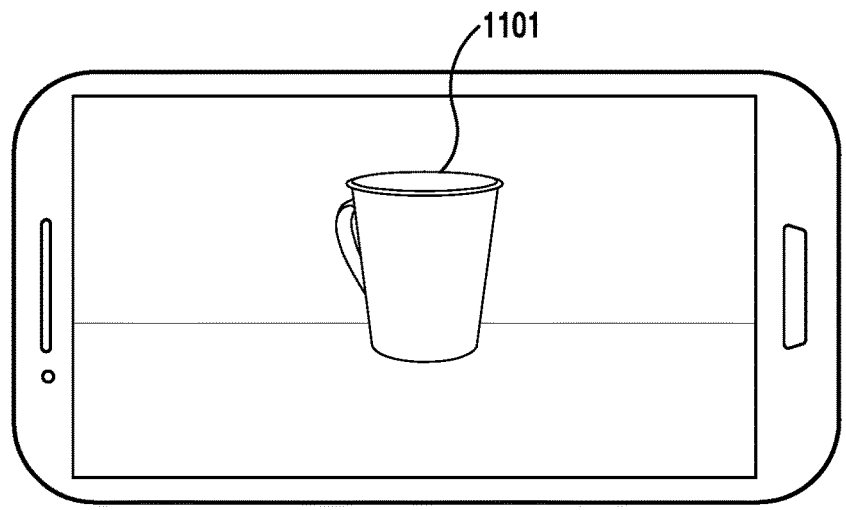

FIGS. 11A and 11B depict an image processing method for an eraser function according to one embodiment of the present disclosure.

An image of FIG. 11A includes a stationary object and a moving object. The electronic device 101 can obtain a plurality of images including an image including the moving object 1103. The electronic device (e.g., the management module 121) can generate relevant data including movement information of the object in the images. For example, while capturing images or storing a captured image, the electronic device (e.g., the scoring module 123) can score the object movement in the images.

In response to a request for providing the acquired image, the electronic device 101 can delete the image 1103 of the object movement over a preset value from the acquired images, and provide an image 1101 including the stationary object.

Figure 12A:
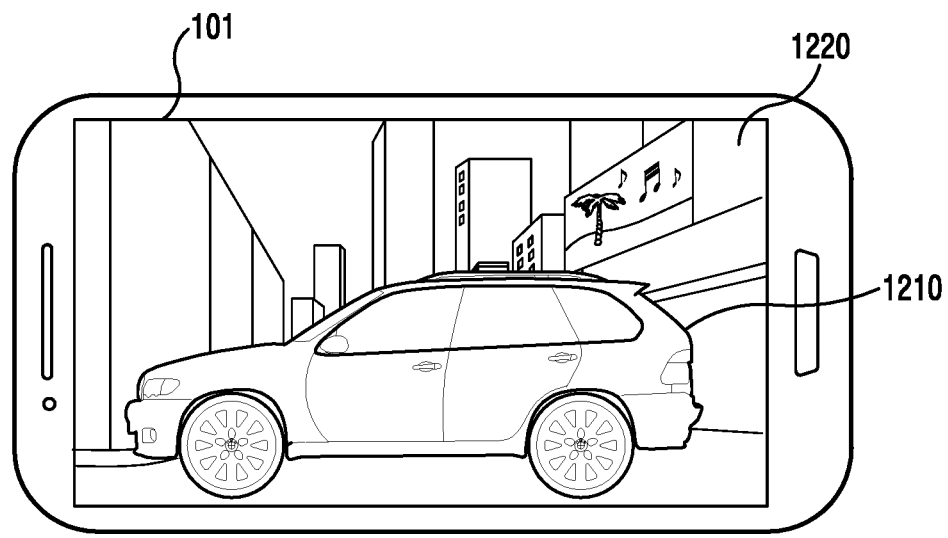
FIG. 12A and FIG. 12B are diagrams of an image processing method for a panning shot function according to one embodiment of the present disclosure.
Figure 12B:
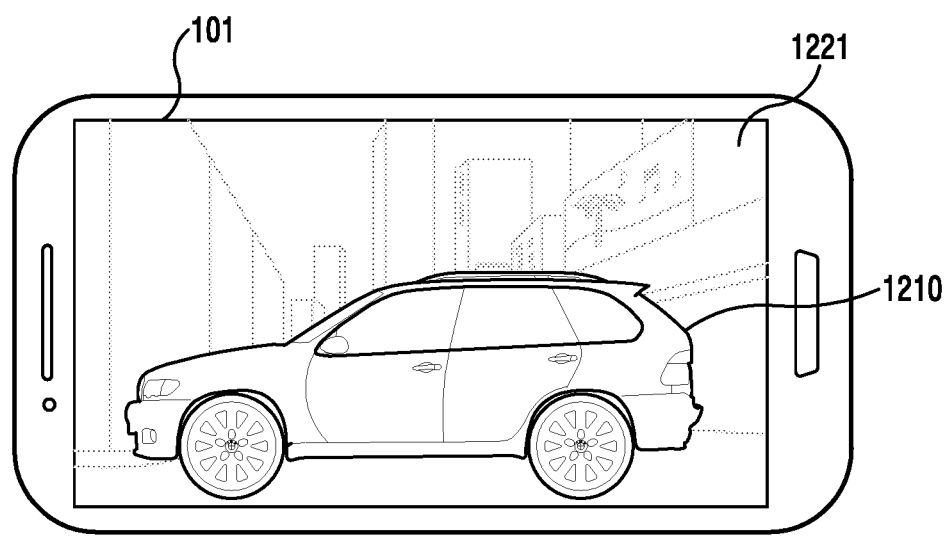

FIGS. 12A and 12B depict an image processing method for a panning shot function according to one embodiment of the present disclosure.

An image of FIG. 12A includes a moving object and a background. The electronic device 101 can obtain a plurality of images including an image including the moving object 1210. The electronic device (e.g., the management module 121) can generate relevant data including movement information of the object in the images. For example, while capturing a scene or storing a captured image, the electronic device (e.g., the scoring module 123) can score relative movement against the background 1220 of at least one object in the images.

In response to a request for providing the acquired image, the electronic device 101 (e.g., the processing module 125) can motion-blur a background image 1221 of the scene, excluding the moving object as shown in FIG. 12B.

Figure 13:
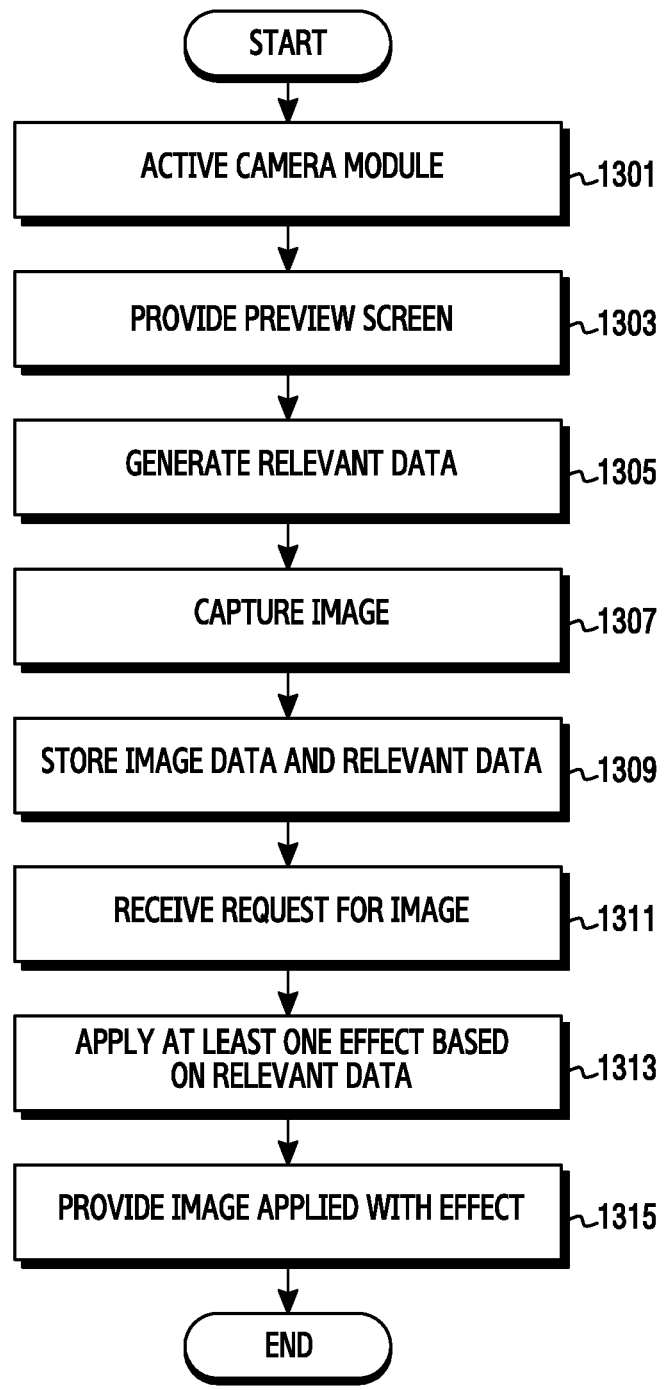
FIG. 13 is a flowchart of an image processing method according to another embodiment of the present disclosure.

FIG. 13 is a flowchart of an image processing method according to another embodiment of the present disclosure.

The image processing method of FIG. 13 can include, but not limited to, a function for recognizing an object in the image and editing an object image, or applying an additional effect.

In operation 1301, the electronic device (e.g., the processor 120) can activate the camera module 291. For example, after receiving a user input for executing a camera application, the electronic device can drive the camera module 291.

In operation 1303, the electronic device (e.g., the processor 120) can provide a preview screen using the camera module 291.

In operation 1305, the electronic device (e.g., the management module 121) can generate relevant data, the process of which is described in detail above. When the preview is displayed and a preset input is received, the electronic device (e.g., the scoring module 123) can score the image for the relevant data generation.

For example, while displaying the preview and after receiving a touch input on a preset icon (or an area or a button), a touch input (or a long touch input) over a certain time on the display 160 displaying the preview, or a preset key input, the electronic device (e.g., the scoring module 123) can score the image.

For example, when a previewed scene is changed, the electronic device (e.g., the scoring module 123) can score the image. For example, the electronic device (e.g., the processor 120) can detect a change of image frame data previewed. When the image frame data changes over a preset value, the electronic device (e.g., the scoring module 123) can score the changed image (or the changed image frame).

For example, the electronic device (e.g., the scoring module 123) can score the image in association with an auto focus operation. For example, when the focus on the object changes, the electronic device can score the changed image (or the changed image frame).

For example, when the electronic device 101 moves, for example, when the electronic device 101 is tilted, rotated, or moved, the electronic device (e.g., the scoring module 123) can score the image. For example, the electronic device (e.g., the processor 120) can detect its movement through the acceleration sensor (e.g., the acceleration sensor 240E) or the gyro sensor (e.g., the gyro sensor 240B). Upon detecting the movement, the electronic device (e.g., the scoring module 123) can score an acquired image based on the movement.

For example, when detecting a user's grip on the electronic device, the electronic device (e.g., the scoring module 123) can score the image. For example, the electronic device (e.g., the processor 120) can detect the user's grip on the electronic device through a sensor module and detect a change of the user's grip. When detecting the user's grip on the electronic device or the change of the user's grip, the electronic device (e.g., the scoring module 123) can score an acquired image (or image frame).

The electronic device (e.g., the scoring module 123) can calculate (or score) a probability that the acquired image includes a predefined object using at least one recognition module. For example, using the face recognition module or the food recognition module, the electronic device (e.g., the scoring module 123) can calculate (or score) a probability that the acquired image includes a face or a food item.

In operation 1307, the electronic device (e.g., the processor 120) can capture an image. For example, the electronic device (e.g., the processor 120) can acquire the image by capturing a scene in the preview using the camera module 291.

The electronic device (e.g., the processor 120) can acquire one or more images using the camera module 291. For example, using the camera module 291, the electronic device (e.g., the processor 120) can acquire an image by operating the shutter of the camera. As another example, the electronic device (e.g., the processor 120) can acquire a plurality of images (or successive images) using the camera module 291.

In operation 1309, the electronic device (e.g., the processor 120) can store the at least one acquired image and the relevant data of the at least one acquired image.

In one embodiment, when the captured image is stored in the JPEG format, the relevant data can be contained in the header area of the JPEG file. For example, the relevant data can be contained in the application data area of the JPEG file of the acquired image. The relevant data or the acquired image data is not limited to the JPEG format, and can adopt various formats such as TIFF or GIF, or any other suitable format.

In another embodiment, the relevant data can be stored separately from the acquired image. For example, the relevant data can be stored in the separate memory 130, but another data structure, such as a table, can store the correspondence (to map or to link) between the relevant data and the captured images.

In one embodiment, the electronic device (e.g., the processor 120) can temporarily store the at least one acquired image and the relevant data of the at least one acquired image. For example, the electronic device (e.g., the processor 120) can temporarily store the at least one acquired image and the relevant data of the at least one acquired image, and store in the memory 130 the image changed or applied with the effect after the preset function is executed.

In operation 1311, the electronic device (e.g., the processor 120) can receive a request for an image. For example, the electronic device (e.g., the processor 120) can receive a user input for requesting to provide the at least one acquired image.

In operation 1313, at least based on the relevant data, the electronic device (e.g., the processing module 125) can apply at least one effect. The electronic device (e.g., the processing module 125) can recognize an object in the acquired image at least based on the relevant data. For example, the electronic device (e.g., the processing module 125) can determine the object in the acquired image at least based on the score information (or probability information) of the acquired image. For example, when the probability (or the score) of the food is over a preset value, the electronic device (e.g., the processor 120) can determine that the object in the acquired image is a food. As another example, when the probability (or the score) of the face is over a preset value, the electronic device (e.g., the processor 120) can determine that the object in the acquired image is a face.

The electronic device (e.g., the processing module 125) can apply an additional effect according to the determined object.

For example, when the object is the food, the electronic device (e.g., the processing module 125) can increase the hue, the brightness, the contrast of the food. For example, when the object is a person, the electronic device (e.g., the processing module 125) can remove a blemish from the face or increase the face tone. These are only two examples of the present disclosure and the present disclosure is not so limited.

In operation 1315, the electronic device (e.g., the processing module 125) can provide the image applied with the effect. For example, when the object is the food, the electronic device (e.g., the processing module 125) can provide the image by increasing the hue, the brightness, the contrast of the food. For example, when the object is a person, the electronic device (e.g., the processing module 125) can provide the image by, removing a blemish from the face or increasing the face tone.

The relevant data is generated only during, but not limited to, the preview in FIG. 13. For example, the relevant data can be generated while capturing an image or storing acquired data after the image capturing.

Figure 14A:
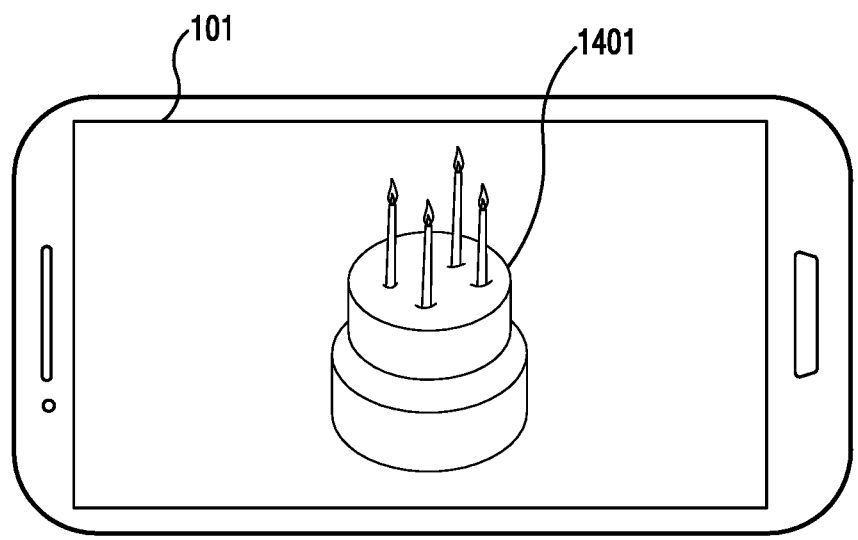
FIG. 14A and FIG. 14B are diagrams of image processing according to another embodiment of the present disclosure.
Figure 14B:
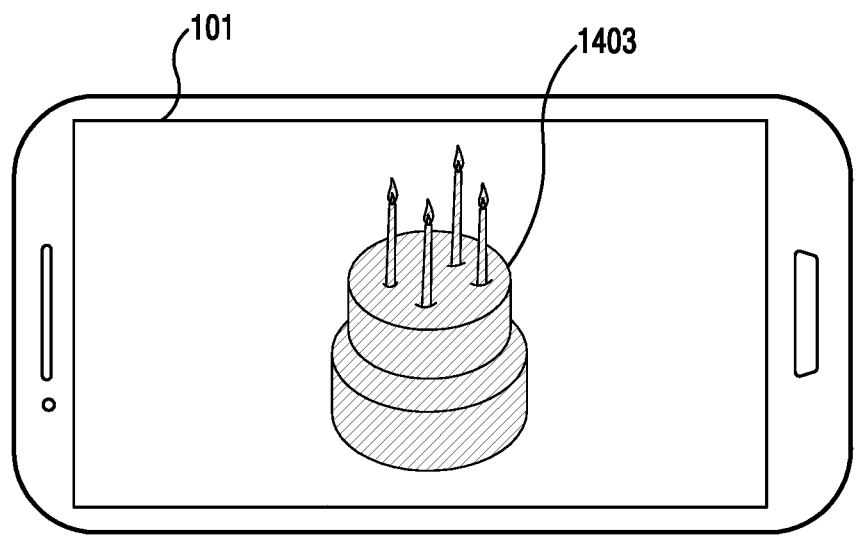

FIGS. 14A and 14B depict image processing according to another embodiment of the present disclosure.

As shown in FIG. 14A, the electronic device 101 can provide a preview screen. In one embodiment, the electronic device 101 can generate relevant data while providing the preview, capturing the image, or storing an acquired image. In another embodiment, the electronic device 101 can perform at least a portion of a preset function while providing the preview, capturing the image, or storing an acquired image. For example, the electronic device 101 can score an object in the preview.

In response to a request for providing the acquired image, the electronic device 101 can execute a preset function, for example, a function for recognizing the object and applying an effect to the object. For example, in response to the request for the acquired image, the electronic device 101 can recognize that the acquired object is a food 1401 (e.g., a cake) and apply an effect to the acquired object as shown in FIG. 14B. For example, the electronic device 101 can provide an object 1403 by increasing the hue, the brightness, the contrast of the acquired image.

Figure 15A:
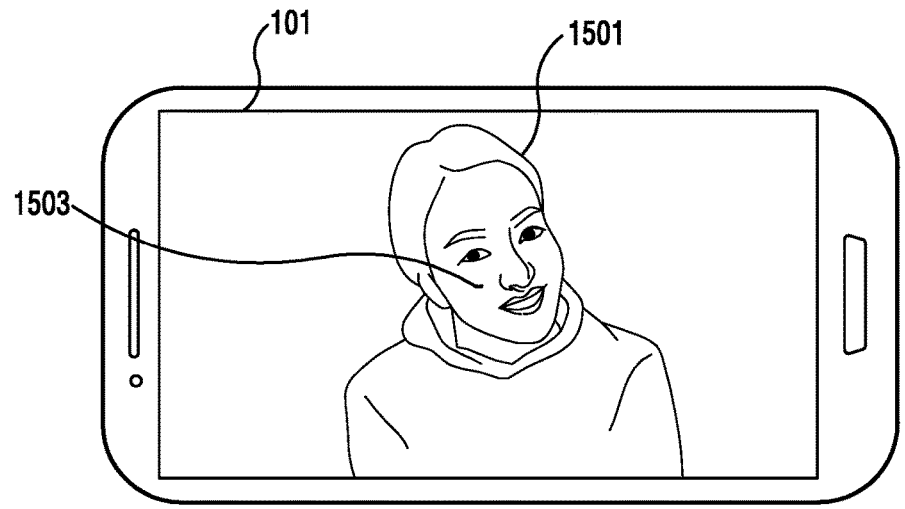
FIG. 15A and FIG. 15B are diagrams of image processing according to another embodiment of the present disclosure.
Figure 15B:
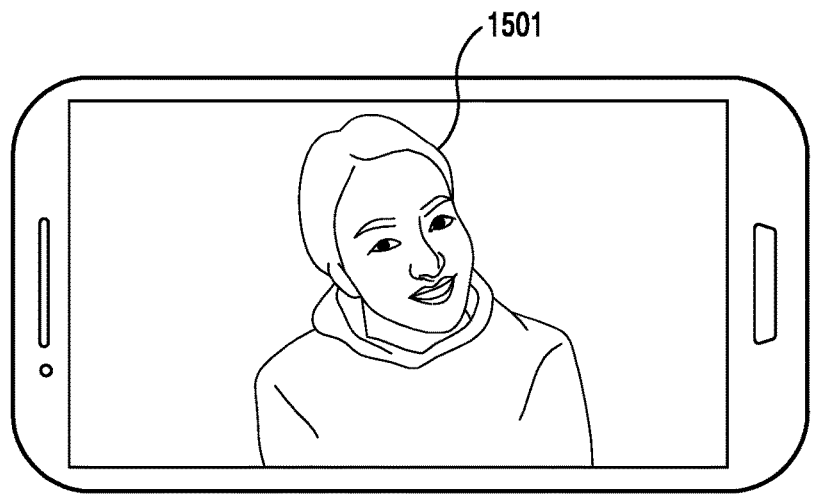

FIGS. 15A and 15B depict image processing according to another embodiment of the present disclosure.

Referring to FIG. 15A, the electronic device 101 can provide a preview screen. In one embodiment, the electronic device 101 can generate relevant data while providing the preview, capturing an image, or storing a captured image. In another embodiment, the electronic device 101 can perform at least a portion of a preset function while providing the preview, capturing an image, or storing a captured image. For example, the electronic device 101 (e.g., the scoring module 123) can score an object in the preview.

In response to a request for the acquired image, the electronic device 101 (e.g., the processing module 125) can execute a preset function, for example, a function for recognizing the object and applying an effect to the object. For example, in response to the request for the acquired image, the electronic device 101 can recognize that the acquired object is a face 1501 and apply an effect to the acquired object as shown in FIG. 15B. For example, the electronic device 101 can provide the image by removing a blemish 1503 from the face.

According to various embodiments of the present disclosure, a method includes displaying a preview image obtained from a camera on a first user interface on a display, receiving a first input of a user, capturing a plurality of images using the camera in response to the first input of the user, for each captured plurality of images, generating data corresponding to a processing of the captured plurality of images, receiving a second input of the user during or after the data generation, processing at least one of the captured plurality of images based on the generated data in response to the received second input, and displaying the processed at least one of the captured plurality of images on a second user interface on the display.

The generated data relates to at least one of a user input duration time for capturing the image, a type of an object in the image, a movement information of the electronic device, a blur, a facial expression, and an eyeblink in each of the captured plurality of images.

The generated data includes at least one score generated based on the at least one of the user input duration time for capturing the image, the type of the object in the image, the movement information of the electronic device, the blur, the facial expression, and the eyeblink in each of the plurality of images.

The method may further include selecting the at least one of the captured plurality of images for processing based in part on the at least one score.

The method may further include displaying the selected at least one image on the second user interface without an additional user input after the second input is received.

The method may further include displaying an indication to indicate that the selected at least one image is processed.

The method may further include displaying an icon corresponding to the camera on the display, receiving a user selection for selecting the icon, and displaying the preview image obtained from the camera on the first user interface on the display using a default setting, in response to the received user selection.

The method may further include displaying an icon corresponding to the camera on the display, receiving a user selection for selecting the icon, displaying an indicator to indicate that the camera is in an auto mode in response to the received user selection and displaying the preview image obtained from the camera on the first user interface on the display using a default setting, in response to the received user selection.

According to various embodiments of the present disclosure, a method includes displaying an image obtained through a camera on a first user interface on a display, generating data corresponding to a processing of the image by executing a portion of, but not an entirety of, at least one of a plurality of routines for image processing while displaying the image, receiving a first user input for capturing the image during or after the data generation, capturing the image using the camera in response to the first user input, selecting at least one of the plurality of routines based on the generated data, and processing the captured image by executing a remaining portion of the at least one selected routine.

The method may further include displaying the processed image a second user interface on the display.

The generated data relates to at least one of a user input duration time for capturing the image, a type of an object in the image, a movement information of the electronic device, a blur of the image, a facial expression in the image, and an eyeblink in the image.

The generated data includes at least one score generated based on at least one of the user input duration time for capturing the image, the type of the object in the image, the movement information of the electronic device, the blur of the image, the facial expression in the image, and the eyeblink in the image.

The method may further include selecting the at least one of the plurality of routines based in part on the at least one score.

The method may further include receiving a second user input for opening the second user interface, and displaying the processed image on the second user interface without an additional user input after receiving the second user input.

The method may further include receiving a second user input for opening the second user interface, and displaying an indication to indicate that the captured image is processed on the second user interface without an additional user input after receiving the second user input.

The method may further include displaying an icon corresponding to the camera on the display, receiving a user selection for selecting the icon; and displaying the image obtained from the camera on the first user interface on the display using a default setting, in response to the received user selection.

The method may further include displaying an icon corresponding to the camera on the display, receiving a user selection for selecting the icon, displaying an indicator to indicate that the camera is in an auto mode in response to the received user selection, and displaying the image obtained from the camera on the first user interface on the display using a default setting, in response to the received user selection.

According to various embodiments of the present disclosure, a method for processing an image includes capturing at least one image using a camera, obtaining an attribute of the at least one image and generating data related to the attribute, storing the at least one image and the generated data, receiving a user request for the captured image, and in response to the received user request, performing at least a portion of at least one preset function on the at least one image obtained using a camera based on the generated data.

Performing the at least one preset function further comprises performing a remaining portion of the at least one preset function.

The at least one preset function may include at least one of a function to recommend a best photo, a function to select a best face in the at least one image, an eraser function, a panning shot function, and an image processing function for an object in the at least one image.

As set forth above, the image processing method and the electronic device supporting the same can enhance performance and realtime of the electronic device by fulfilling a portion of the image processing function while acquiring the image using the camera.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for."

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a camera;
   a display;
   a processor coupled to the camera and the display; and
   a memory coupled to the processor, wherein the processor when executing instructions stored in the memory is configured to:
      display a preview image obtained from the camera on a first user interface on the display,
      receive a first user input for capturing an image, while displaying the preview image,
      capture a plurality of images through the camera, in response to receiving the first user input,
      in response to capturing the plurality of images, generate data corresponding to a portion of a processing of the captured plurality of images by performing the portion of the processing, while maintaining displaying the preview image,
      receive a second user input for displaying an image associated with the captured plurality of images, during or after the data generation,
      in response to receiving the second user input, perform, based on the generated data, a remaining portion of the processing, and
      after the remaining portion of the processing is performed, display the image on a second user interface on the display.

2. The electronic device of claim 1, wherein the generated data relates to at least one of a user input duration time for capturing the image, a type of an object in the image, a movement information of the electronic device, a blur, a facial expression, or an eyeblink in each of the captured plurality of images.

3. The electronic device of claim 2, wherein the generated data includes at least one score generated based on the at least one of the user input duration time for capturing the image, the type of the object in the image, the movement information of the electronic device, the blur, the facial expression, or the eyeblink in each of the plurality of images.

4. The electronic device of claim 3, wherein the processor is further configured to select the at least one of the captured plurality of images for processing based in part on the at least one score, after receiving the second user input.

5. The electronic device of claim 4, wherein the processor is further configured to display the selected at least one image on the second user interface without an additional user input after the second input is received.

6. The electronic device of claim 4, wherein the processor is further configured to display an indication to indicate that the selected at least one image is processed.

7. The electronic device of claim 1, wherein the processor is further configured to:
   display an icon corresponding to the camera on the display,
   receive a user selection for selecting the icon, and
   display the preview image obtained from the camera on the first user interface on the display using a default setting, in response to the received user selection.

8. The electronic device of claim 1, wherein the processor is further configured to:
   display an icon corresponding to the camera on the display,
   receive a user selection for selecting the icon,
   display an indicator to indicate that the camera is in an auto mode in response to the received user selection, and
   display the preview image obtained from the camera on the first user interface on the display using a default setting, in response to the received user selection.

9. A method of an electronic device, comprising:
   displaying a preview image obtained from a camera on a first user interface on a display;
   receiving a first user input for capturing an image, while displaying the preview image;
   capturing a plurality of images through the camera, in response to receiving the first user input;
   in response to capturing the plurality of images, generating data corresponding to a portion of a processing of the captured plurality of images by performing the portion of the processing, while maintaining displaying the preview image;

receiving a second user input for displaying an image associated with the captured plurality of images, during or after the data generation;

in response to receiving the second user input, perform, based on the generated data, a remaining portion of the processing; and after the remaining portion of the processing is performed, displaying the image on a second user interface on the display.

10. The method of claim 9, wherein the generated data relates to at least one of a user input duration time for capturing the image, a type of an object in the image, a movement information of the electronic device, a blur, a facial expression, or an eyeblink in each of the captured plurality of images.

11. The method of claim 10, wherein the generated data includes at least one score generated based on the at least one of the user input duration time for capturing the image, the type of the object in the image, the movement information of the electronic device, the blur, the facial expression, or the eyeblink in each of the plurality of images.

12. The method of claim 11, further comprising:
selecting the at least one of the captured plurality of images for processing based in part on the at least one score, after receiving the second user input.

13. The method of claim 12, further comprising:
displaying the selected at least one image on the second user interface without an additional user input after the second input is received.

14. The method of claim 12, further comprising:
displaying an indication to indicate that the selected at least one image is processed.

15. The method of claim 9, further comprising:
displaying an icon corresponding to the camera on the display;
receiving a user selection for selecting the icon; and
displaying the preview image obtained from the camera on the first user interface on the display using a default setting, in response to the received user selection.

16. The method of claim 9, further comprising:
displaying an icon corresponding to the camera on the display;
receiving a user selection for selecting the icon;
displaying an indicator to indicate that the camera is in an auto mode in response to the received user selection; and
displaying the preview image obtained from the camera on the first user interface on the display using a default setting, in response to the received user selection.

* * * * *